(12) United States Patent  (10) Patent No.: US 10,894,460 B2
Yamauchi et al.  (45) Date of Patent: Jan. 19, 2021

(54) OCCUPANT DETECTION SYSTEM

(71) Applicant: DENSO CORPORATION, Kariya (JP)

(72) Inventors: Takuma Yamauchi, Kariya (JP); Eitaro Tanaka, Kariya (JP); Haruhiko Watanabe, Kariya (JP); Fuminobu Watanabe, Kariya (JP); Goro Ueda, Kariya (JP); Akira Oga, Kariya (JP); Hiroshi Takeda, Kariya (JP); Kazuya Taniguchi, Kariya (JP); Tatsumi Kumada, Kariya (JP); Kazuaki Takemoto, Kariya (JP); Takashi Sato, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/416,779

(22) Filed: May 20, 2019

(65) Prior Publication Data

US 2019/0299743 A1 Oct. 3, 2019

Related U.S. Application Data

(63) Continuation of application No. PCT/JP2017/036864, filed on Oct. 11, 2017.

(30) Foreign Application Priority Data

Nov. 24, 2016 (JP) ................. 2016-227510

(51) Int. Cl.
 B60H 1/00 (2006.01)
 G01J 5/08 (2006.01)
 (Continued)

(52) U.S. Cl.
 CPC ........... *B60H 1/00742* (2013.01); *B60H 1/00* (2013.01); *G01B 11/00* (2013.01); *G01J 5/0803* (2013.01);
 (Continued)

(58) Field of Classification Search
 CPC .. B60H 1/00742; G01V 8/10; G06K 9/00838; G01J 5/0803; G01J 2005/0077
 (Continued)

(56) References Cited

U.S. PATENT DOCUMENTS

2009/0295921 A1   12/2009  Fujita
2015/0055678 A1*  2/2015   Kawata ................... G01S 17/04
                                                            374/121
2015/0379361 A1*  12/2015  Boulanger ............... H04N 5/33
                                                            701/2

FOREIGN PATENT DOCUMENTS

JP   2004177349 A   6/2004
JP   2005106538 A   4/2005
(Continued)

*Primary Examiner* — On S Mung
(74) *Attorney, Agent, or Firm* — Harness, Dickey & Pierce, P.L.C.

(57) ABSTRACT

An occupant detection system may detect a state of an occupant in a vehicle compartment. The occupant detection system may photograph the vehicle compartment and generate an image. The occupant detection system may change an attitude in order to change a position of an imaging region within the vehicle compartment. The occupant detection system may estimate the attitude based on information included in the image and control an operation based on the estimated attitude. The sensor may be provided by an infrared temperature sensor. The image may be provided by a thermal image showing a temperature distribution of the vehicle compartment. The occupant detection system may store a correspondence relationship between a position of a specific temperature boundary included in the thermal image and the attitude. The occupant detection system may estimate the attitude based on the correspondence relationship.

8 Claims, 20 Drawing Sheets

(51) Int. Cl.
*G01V 8/10* (2006.01)
*G06K 9/00* (2006.01)
*G01B 11/00* (2006.01)
*H04N 7/18* (2006.01)
*G01J 5/48* (2006.01)
*G06T 1/00* (2006.01)
*G01J 5/04* (2006.01)
*G01J 5/00* (2006.01)

(52) U.S. Cl.
CPC ................ *G01J 5/48* (2013.01); *G01V 8/10* (2013.01); *G06K 9/00838* (2013.01); *G06T 1/00* (2013.01); *H04N 7/18* (2013.01); *G01J 5/04* (2013.01); *G01J 2005/0077* (2013.01)

(58) Field of Classification Search
USPC .......................................................... 348/77
See application file for complete search history.

(56) References Cited

FOREIGN PATENT DOCUMENTS

| | | | |
|---|---|---|---|
| JP | 2015083915 | A | 4/2015 |
| JP | 2016042783 | A | 3/2016 |
| WO | WO-2007043452 | A1 | 4/2007 |
| WO | WO-2014022667 | A2 | 2/2014 |

* cited by examiner

FIG. 9
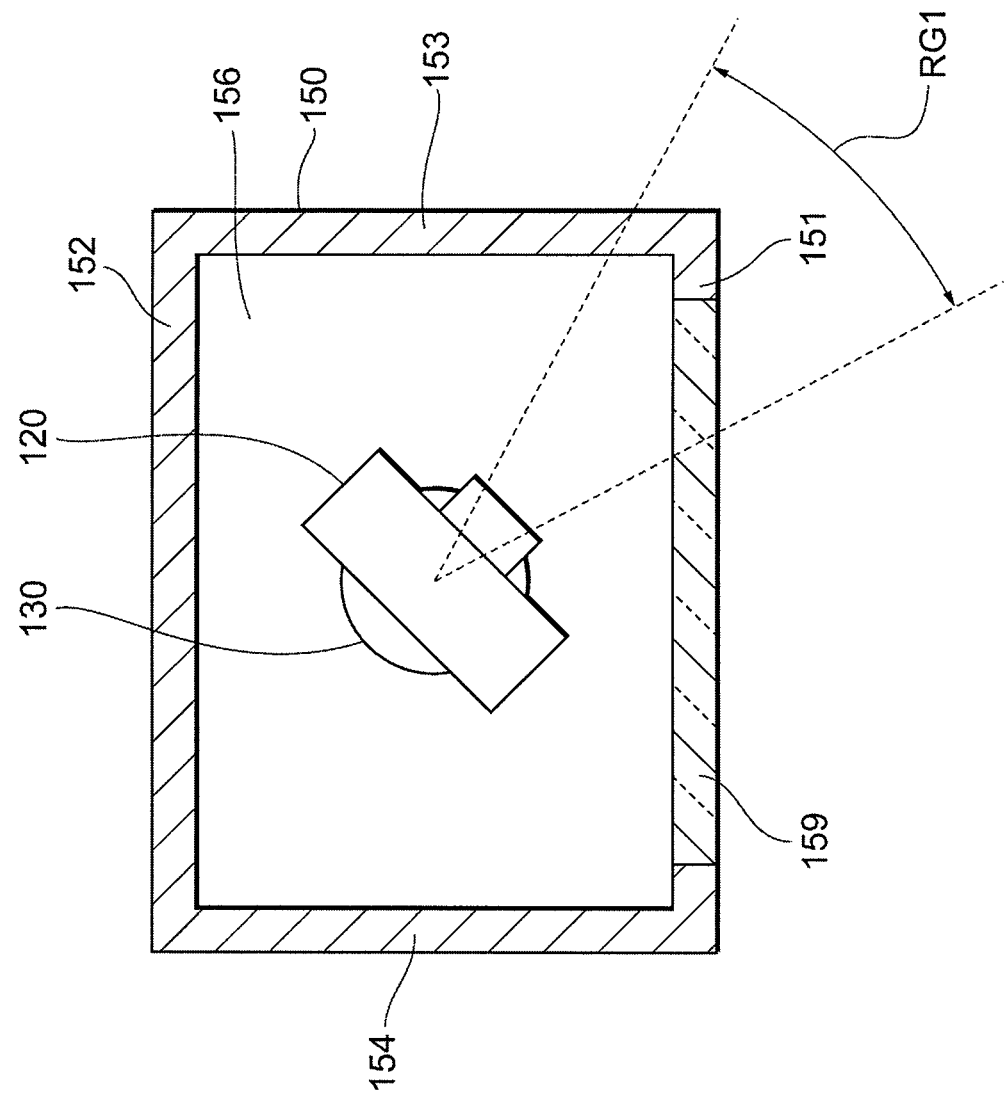
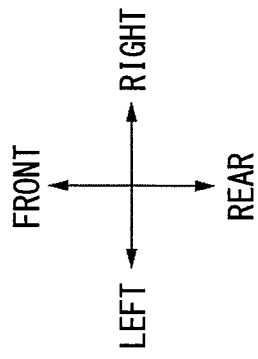

FIG. 20
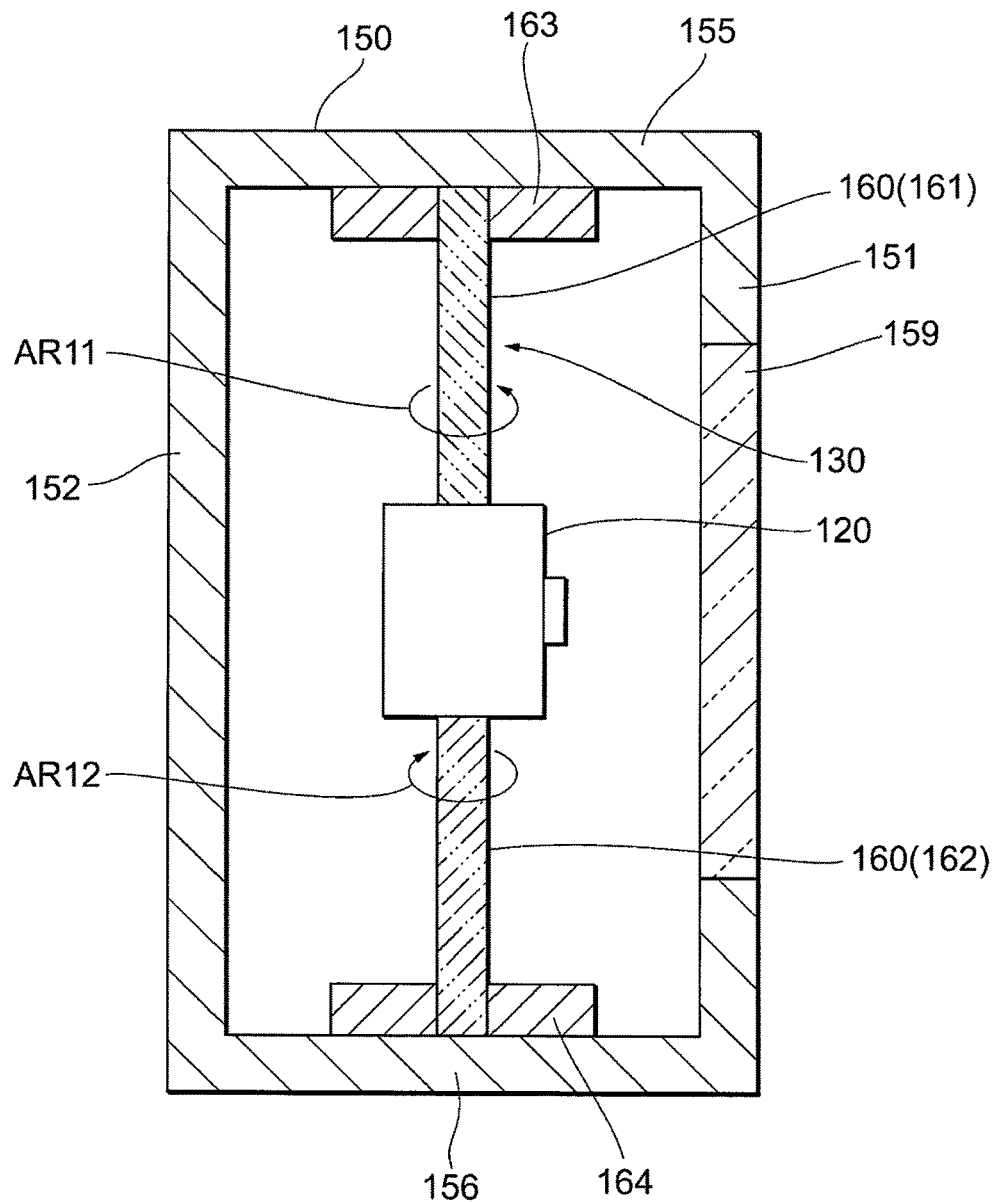
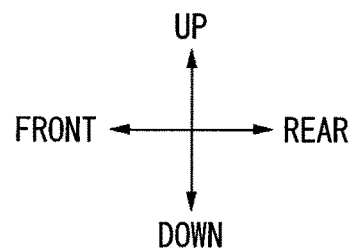

OCCUPANT DETECTION SYSTEM

CROSS REFERENCE TO RELATED APPLICATIONS

The present application is a continuation application of International Patent Application No. PCT/JP2017/036864 filed on Oct. 11, 2017, which designated the United States and claims the benefit of priority from Japanese Patent Application No. 2016-227510 filed on Nov. 24, 2016. The entire disclosures of all of the above applications are incorporated herein by reference.

TECHNICAL FIELD

The present disclosure relates to an occupant detection system that detects a state of an occupant in a vehicle compartment.

BACKGROUND

Some vehicles have an occupant detection system for detecting a state of an occupant. For example, some occupant detection systems may measure the surface temperature of the occupant or the like by an infrared temperature sensor and appropriately control air conditioning based on the temperature distribution shown on the obtained thermal image.

SUMMARY

An occupant detection system may detect a state of an occupant in a vehicle compartment. The occupant detection system may photograph the vehicle compartment and generate an image. The occupant detection system may change an attitude in order to change a position of an imaging region within the vehicle compartment. The occupant detection system may estimate the attitude based on information included in the image and control an operation based on the estimated attitude.

BRIEF DESCRIPTION OF DRAWINGS

The above and other objects, features and advantages of the present invention will become more apparent from the following detailed description made with reference to the accompanying drawings. In the drawings:

FIG. 9 is a diagram schematically showing a configuration of an infrared temperature sensor and a periphery of the infrared temperature sensor in an occupant detection system according to a fourth embodiment;

FIG. 20 is a diagram schematically showing a configuration of an infrared temperature sensor and a periphery of the infrared temperature sensor in an occupant detection system according to a ninth embodiment.

DETAILED DESCRIPTION

Figure 1:
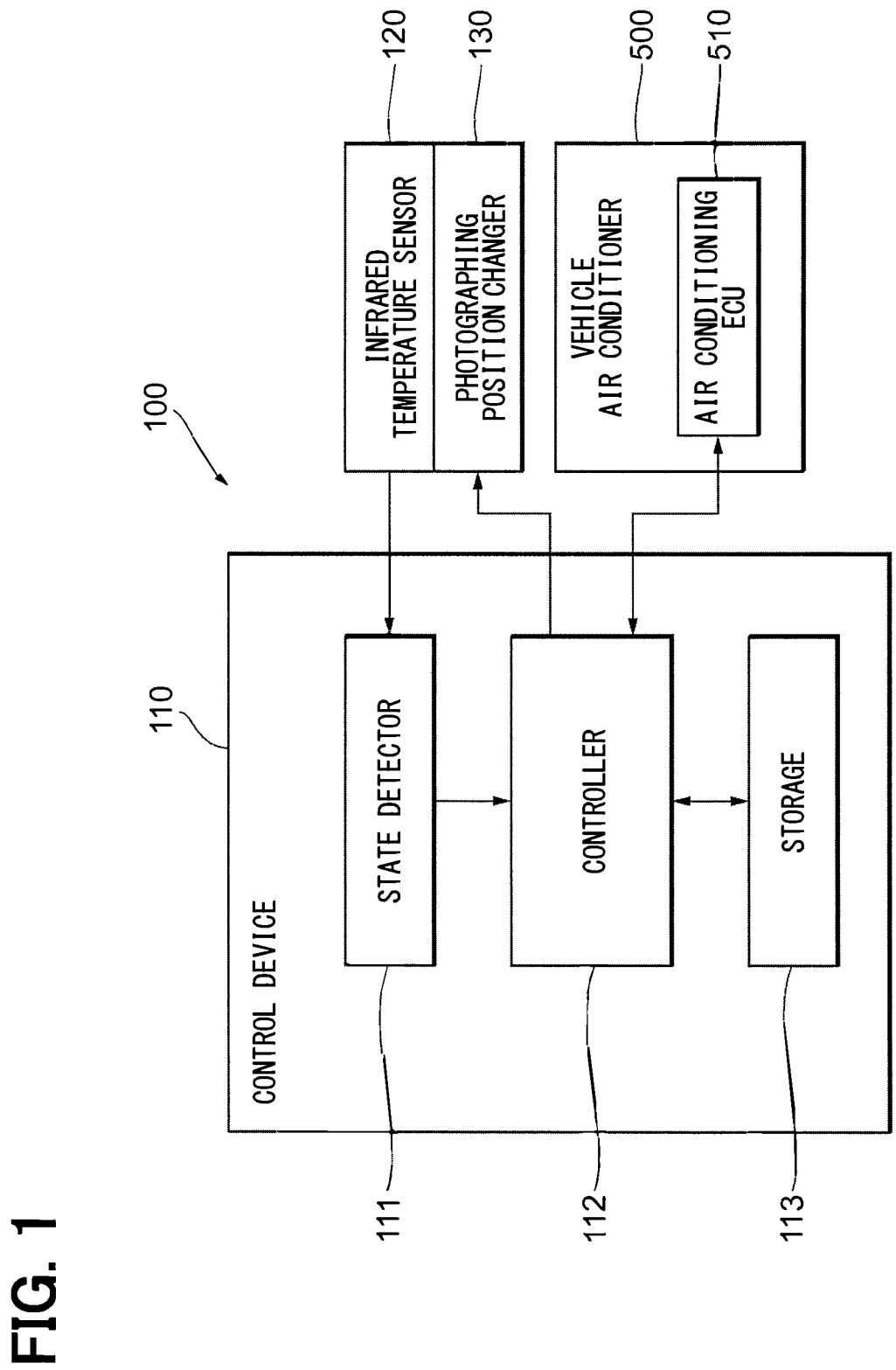
FIG. 1 is a diagram schematically showing a configuration of an occupant detection system according to a first embodiment.

For example, some vehicles have an occupant detection system for detecting a state of an occupant. Some occupant detection systems may measure the surface temperature of the occupant or the like by an infrared temperature sensor and appropriately control air conditioning based on the temperature distribution shown on the obtained thermal image. Some occupant detection systems may photograph the face of the occupant by a camera, and analyze the obtained image. With this configuration, the occupant detection system determines whether the occupant feels sleepy.

Ideally, the occupant detection system can detect the states of all the occupants in the vehicle compartment at the same time. A sensor with a wide detection range is relatively expensive, so that this kind of sensors may make the cost of occupant detection system increased. Therefore, with the use of an inexpensive sensor (for example, an infrared temperature sensor) having a relatively narrow detection range, so-called "scan" is performed while changing the attitude of the sensor. With this configuration, detection of the state of the occupant over a wide range is performed.

An air conditioner scans the entire room while changing the attitude of the infrared temperature sensor and obtains temperature distribution and the existence of people.

When the control device performs control to change the attitude of the sensor, for example, control to swing the sensor, it is necessary for the control device that performs the control to accurately grasp the attitude (for example, rotation angle) of the sensor at the present time. With this configuration, the occupant detection system is capable of grasping which part of a vehicle compartment the occupant detection system is currently detecting. As a configuration for accurately grasping the attitude of the sensor, it is common to provide a rotation angle sensor such as a resolver on the rotation axis of a drive device that changes the attitude of the sensor. In this configuration, the attitude of the sensor is determined based on the signal from the rotation angle sensor.

It is not preferable to additionally provide the rotation angle sensor or the like in order to detect the attitude of the sensor, since it increases the cost of the entire occupant detection system. In particular, when a sensor that requires scanning, that is, an inexpensive sensor with a narrow detection range is used, the cost increase needs to be suppressed as much as possible.

An example embodiment of the present disclosure provides an occupant detection system that detects a state of an occupant while changing an attitude of a sensor, but does not need to separately provide a sensor for detecting the attitude of the sensor.

In an example embodiment of the present disclosure, an occupant detection system detecting a state of an occupant in a vehicle compartment is provided. The occupant detection system includes a sensor, a photographing position changer, and a controller. The sensor photographs the vehicle compartment and generates an image. The photographing position changer changes an attitude of the sensor to change a position of a imaging region, which is a region photographed by the sensor, within the vehicle compartment. The controller estimates the attitude of the sensor based on information included in the image and control an operation of the photographing position changer based on the estimated attitude. The sensor is provided by an infrared temperature sensor. The image is provided by a thermal image showing a temperature distribution of the vehicle compartment. The occupant detection system further includes a storage that stores a correspondence relationship between a position of a specific temperature boundary included in the thermal image and the attitude of the sensor. The controller estimates the attitude of the sensor based on the correspondence relationship. The occupant detection system further includes an emitter that emits infrared light toward the sensor from a specific position in the vehicle compartment.

With the occupant detection system, the controller estimates the attitude of the sensor based on the information included in the image generated by the sensor. The "image" includes not only a general image generated by a CCD camera or the like, but also a thermal image (image showing a temperature distribution) generated by an infrared temperature sensor. Further, the "image" does not necessarily have to be an image in a state directly viewed by a human, but may be an image in a state stored as internal data by the occupant detection system.

Assume that the correspondence relationship between a position of a specific object or a position of a temperature boundary included in the image and the attitude of the sensor is stored in advance. In this case, the controller can estimate the attitude of the sensor based on the correspondence relationship. With this configuration, since the attitude of the sensor can be estimated based on the information included in the image generated by the sensor, it is not necessary to separately provide a sensor for detecting the attitude of the sensor.

With the present disclosure, the occupant detection system that detects a state of an occupant while changing an attitude of a sensor, but does not need to separately provide a sensor for detecting the attitude of the sensor is provided.

Hereinafter, the present embodiments will be described with reference to the attached drawings. In order to facilitate the ease of understanding, the same reference numerals are attached to the same constituent elements in each drawing as much as possible and redundant explanations are omitted.

An occupant detection system 100 according to a first embodiment will be described with reference to FIGS. 1 and 2. A vehicle 10 to which the occupant detection system 100 is attached is provided with a vehicle air conditioner 500 for performing air conditioning in a vehicle compartment RM. The occupant detection system 100 is a system for detecting the state of occupants (specifically, the surface temperature) by an infrared temperature sensor 120 so as to enables the vehicle air conditioner 500 to properly air condition in the vehicle compartment RM.

As shown in FIG. 1, the occupant detection system 100 includes a control device 110, the infrared temperature sensor 120, and a photographing position changer 130.

The control device 110 is a device for controlling the overall operation of the occupant detection system 100. The control device 110 is constituted as a computer system having a CPU, a ROM, a RAM, and the like. The control device 110 includes a state detector 111, a controller 112, and a storage 113 as functional control blocks.

The state detector 111 receives an electrical signal transmitted from the infrared temperature sensor 120 described later, and generates a thermal image (an image showing a temperature distribution in the vehicle compartment RM). Thermal image data generated by the state detector 111 is transmitted from the state detector 111 to the controller 112.

When the infrared temperature sensor 120 has a function of generating and transmitting the thermal image by itself, the state detector 111 as described above is unnecessary. In this case, the thermal image data generated by the infrared temperature sensor 120 may be directly transmitted to the controller 112.

The controller 112 executes various operations required to control the occupant detection system 100 and serves as the core of the control device 110. The controller 112 has a function of transmitting the temperature distribution of each part shown in the thermal image obtained from the state detector 111 to an air conditioning ECU 510 of the air conditioner 500 for the vehicle. The air conditioning ECU 510 controls the operation of the vehicle air conditioner 500 based on the temperature distribution. For example, when the surface temperature of one of the occupants is high, a louver (not shown) or the like is controlled so that the low-temperature conditioned air is directed to the occupant.

The vehicle air conditioner 500 is an air conditioner provided in the vehicle 10 in order to perform air conditioning in the vehicle compartment RM. The vehicle air conditioner 500 includes a compressor, a condenser, an evaporator, a throttle valve, a blower fan, and the like (not shown), and all of the elements together form a refrigeration cycle. In the present embodiment, the air conditioning ECU 510 controls the rotation speed of the blower fan, the opening degree of the throttle valve, the operation of various doors (not shown) provided in the vehicle air conditioner 500, and the like. With this configuration, the air conditioning ECU 510 adjusts the temperature and the wind direction of the conditioned air blown into the inside of the vehicle compartment RM. Since the specific configuration of the vehicle air conditioner 500 is well known, specific illustrations and descriptions are omitted.

In addition to the process necessary for communication with the air conditioning ECU 510 as described above, the controller 112 performs a process for transmitting a control signal to the photographing position changer 130 described later in order to change the direction of the infrared temperature sensor 120. The controller 112 receives an operation command that is a command value for the direction of the infrared temperature sensor 120 from the air conditioning ECU 510. The controller 112 controls the operation of the photographing position changer 130 based on the operation command. Thus, the direction of the infrared temperature sensor 120 matches the direction indicated by the operation command from the air conditioning ECU 510. The specific contents of the control process executed by the controller 112 will be described later.

The storage 113 is constituted by a non-volatile memory provided in the control device 110, and stores various kinds of information. The specific contents of the information stored in the storage 113 will be described later.

The control device 110 in the present embodiment is constituted as a separate device from the air conditioning ECU 510 of the vehicle air conditioner 500. Alternatively, the control device 110 and the air conditioning ECU 510 may be constituted as an integrated device. Alternatively, the occupant detection system 100 may be constituted as a part of the vehicle air conditioner 500.

The infrared temperature sensor 120 is a sensor that detects the surface temperature of an object in the vehicle compartment RM based on the radiation (infrared light) from the object. The infrared temperature sensor 120 transmits data obtained by capturing the image in the vehicle compartment RM, that is, data that is the source of the thermal image to the state detector 111 as the electrical signal. As described above, the infrared temperature sensor 120 may have a function of generating the thermal image by itself and transmitting the thermal image to the controller 112.

The photographing position changer 130 is a drive device for changing the attitude (in the present embodiment, "direction") of the infrared temperature sensor 120. The photographing position changer 130 is constituted as a rotating electrical machine in the present embodiment. The photographing position changer 130 rotates a rotating shaft (not shown) when supplied with electric power to change the left-right direction of the infrared temperature sensor 120 that is fixed to the rotating shaft. Alternatively, the photographing position changer 130 may perform translational motion of the infrared temperature sensor 120 in the left-right direction (instead of the rotational motion). As described above, the controller 112 controls the operation of the photographing position changer 130.

When the photographing position changer 130 is driven and the direction of the infrared temperature sensor 120 is changed, the position of a region where the infrared temperature sensor 120 captures the image and detects the surface temperature (hereinafter referred to as "imaging region") changes.

The configuration of the vehicle compartment RM of the vehicle will be described with reference to FIG. 2. A driver seat 21 which is a seat on the right side and a passenger seat 22 which is a seat on the left side are provided on the front side portion in the vehicle compartment RM so as to be adjacent to each other. Further, in the rear side portion, a first rear seat 23 which is a right side seat and a second rear seat 24 which is a left side seat are provided so as to be adjacent to each other. FIG. 2 shows a driver M1 seated in the driver seat 21, a passenger M2 seated in the passenger seat 22, a passenger M3 seated in the first rear seat 23, and a passenger M4 seated in the second rear seat 24. The reference numeral 25 indicates a steering wheel.

An instrument panel 26 is provided further on the front side of the driver seat 21 and the passenger seat 22. A blowout port 27 is formed in the central portion of the instrument panel 26 in the left-right direction. Moreover, a blowout port 28 is formed in the right side part of the instrument panel 26, and a blowout port 29 is formed in the left side part of the instrument panel 26.

Each of the blowout ports 27, 28, 29 is an outlet for air whose temperature has been adjusted by the vehicle air conditioner 500, that is, for the conditioned air. Air conditioning in the vehicle compartment RM is performed with the blowout port 27, and the like blowing out the conditioned air.

The infrared temperature sensor 120 is installed on the upper surface of the instrument panel 26. In particular, the infrared temperature sensor 120 is arranged in the center of the instrument panel 26 along the left-right direction. As described above, the infrared temperature sensor 120 is a temperature sensor for detecting the surface temperature of the occupant in the vehicle compartment RM. The infrared temperature sensor 120 is mounted on the upper surface of the instrument panel 26 via the photographing position changer 130.

Figure 2:
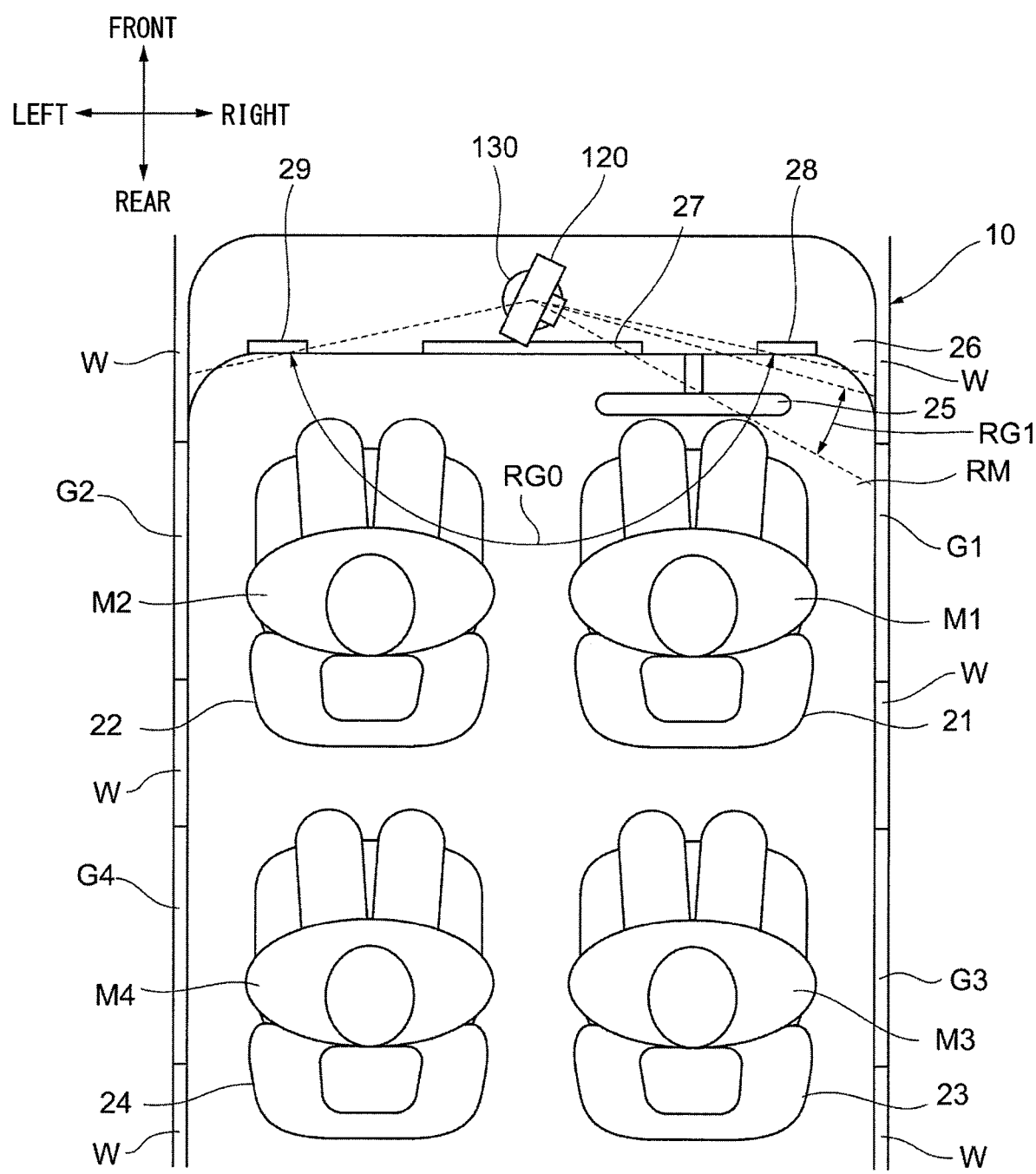
FIG. 2 is a top view diagram schematically showing a vehicle compartment of a vehicle to which an occupant detection system is attached.

In FIG. 2, a range in which the infrared temperature sensor 120 can detect the surface temperature at once is shown as a range RG1. In the present embodiment, a sensor with a relatively narrow angle is used as the infrared temperature sensor 120. Since the range RG1 in which the infrared temperature sensor 120 can detect the surface temperature at once is narrow, it is impossible to simultaneously detect the surface temperature of all occupants (the driver M1 and the passengers M2, M3, M4) at the same time at once.

Therefore, in the present embodiment, the direction of the infrared temperature sensor 120 is changed by the photographing position changer 130, and as a result the surface temperature of each passenger is detected sequentially. Specifically, the photographing position changer 130 periodically swings the infrared temperature sensor 120 to the left and right. With this configuration, the infrared temperature sensor 120 periodically changes the position of the imaging region to detect the surface temperature of each part in the vehicle compartment RM. Thus, the photographing position changer 130 changes the attitude of the infrared temperature sensor 120 so that the position of the imaging region changes in the vehicle compartment RM.

In FIG. 2, the entire range in which the surface temperature can be detected by the swing of the infrared temperature sensor 120 is shown as a range RG0. When the infrared temperature sensor 120 swings, the direction of the range RG1 changes within the range RG0. That is, the location of the imaging region moves left and right within the range RG0. The range RG0 is set as a range including the surfaces of all seated passengers (the driver M1 and the passengers M2, M3, M4).

The vehicle 10 is provided with four doors. In FIG. 2, glasses G1, G2, G3 and G4 provided in the doors are shown. The glass G1 is a glass provided on the door by the driver's seat 21. The glass G2 is a glass provided on the door by the passenger seat 22. The glass G3 is a glass provided on the door by the first rear seat 23. The glass G4 is a glass provided on the door by the second rear seat 24.

In FIG. 2, the reference numeral W is assigned to parts other than the glasses G1, G2, G3, G4 among the inner wall of the vehicle compartment RM. Hereinafter, the inner wall is referred to as an "inner wall W".

Further, the infrared temperature sensor 120 may be installed in a place higher than the upper surface of the instrument panel 26, that is, on an overhead console (not shown) on the ceiling. The installation site of the infrared temperature sensor 120 may be a place reachable by radiation from the surface of each passenger.

While an ignition switch (not shown) of the vehicle 10 is in on state, the control device 110 controls the operation of the photographing position changer 130 so that the infrared temperature sensor 120 swings to the left and right such that the position of the imaging region periodically moves right and left within the range RG0. As a result, the surface temperature of each passenger is sequentially detected. The air conditioning ECU 510 controls the operation of the vehicle air conditioner 500 so that the air conditioning in the vehicle compartment RM can be appropriately performed in consideration of the surface temperature of each occupant detected by the infrared temperature sensor 120. Thus, the configuration enables the thermal sensation perceived by the passenger to be appropriate. The vehicle air conditioner 500 may perform air conditioning in the vehicle compartment in consideration of not only the surface temperature of each portion detected by the infrared temperature sensor 120 but also the air temperature in the vehicle compartment RM, the outside air temperature, or the like.

When performing control to sequentially detect the surface temperature of each portion by changing the attitude of the infrared temperature sensor 120 as described above, the control device 110 needs to accurately grasp the present attitude of the infrared temperature sensor 120 (in the present embodiment, "direction"). As a configuration for grasping the direction of the infrared temperature sensor 120, it is conceivable to separately provide a resolver or the like for detecting the rotation angle of the drive shaft on the drive axis of the photographing position changer 130. From the viewpoint of suppressing the cost of the occupant detection system 100, it is not preferable to provide such an additional sensor.

In the occupant detection system 100 according to the present embodiment, the controller 112 estimates the attitude of the infrared temperature sensor 120 at the time of capturing the thermal image based on the information included in the thermal image received from the state detector 111. The estimation method will be described with reference to FIGS. 2 and 3.

As shown in FIG. 2, the infrared temperature sensor 120 is in the state of turning to the right further than the driver M1. At this time, the imaging region inside the range RG1 includes the glass G1 by the driver's seat 21 and the inner wall W (here, a window frame) adjacent on the front side of the glass G1.

Figure 3:
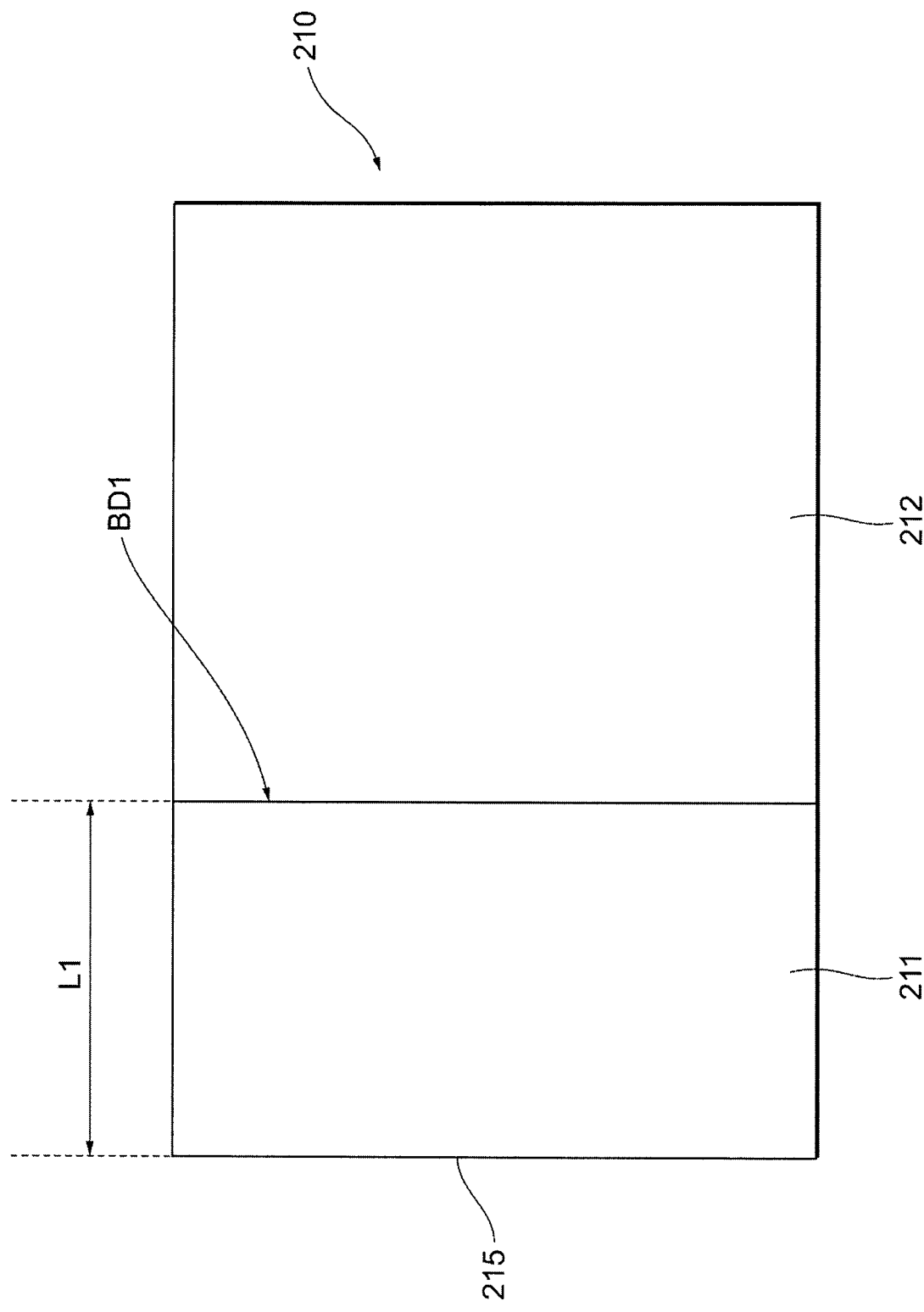
FIG. 3 is a diagram showing an example of a generated thermal image.

FIG. 3 shows an example of a thermal image 210 captured by the infrared temperature sensor 120 and generated by the state detector 111 when the direction of the infrared temperature sensor 120 is directed as shown in FIG. 2. In the thermal image 210, the temperature of the inner wall W is shown in a region 211 on the left side in FIG. 3 and the temperature of the glass G1 is shown in a region 212 on the right side in FIG. 3.

In general, the emissivity of the inner wall W is relatively high and has a value of approximately 1.0. On the other hand, the emissivity of the glass G1 is lower than the emissivity of the inner wall W. Therefore, even when the actual temperature of the inner wall W and the actual temperature of the glass G1 are the same, the two temperatures shown in the thermal image 210 will be different from each other. Specifically, the thermal image 210 is generated such that the temperature of the glass G1 shown in the region 212 is lower than the temperature of the inner wall W shown in the region 211. As a result, a temperature boundary BD1 is formed between the region 211 and the region 212 in the thermal image 210. The temperature boundary BD1 corresponds to the boundary between inner wall W and the glass G1.

The storage 113 of the control device 110 stores the correspondence relationship between the position of the specific temperature boundary BD1 included in the thermal image 210 and the attitude (direction) of the infrared temperature sensor 120 at this time. The "specific" temperature boundary is a temperature boundary that is formed when a specific position in the vehicle compartment RM is imaged. In the present embodiment, the specific temperature boundary represents the temperature boundary BD1 that is formed when the boundary position between the glass G1 and the inner wall W on the front side is captured. The correspondence relationship between the distance L1 from the left end 215 of the thermal image 210 to the temperature boundary BD1 and the direction of the infrared temperature sensor 120 at the time of capturing the image is uniquely determined depending on the arrangement of the infrared temperature sensor 120, the glass G1, and the like. The storage 113 stores such a correspondence relationship in advance.

The controller 112 calculates the position (distance L1) of the temperature boundary BD1 by analyzing the thermal image 210. The controller 112 estimates the direction of the infrared temperature sensor 120 corresponding to the calculated position by referring to the correspondence relationship stored in the storage 113. The controller 112 controls the operation of the photographing position changer 130 based on the estimated direction. As described above, the occupant detection system 100 according to the present embodiment is possible to estimate the direction of the infrared temperature sensor 120 without separately using a rotation angle sensor or the like such as a resolver.

Figure 4:
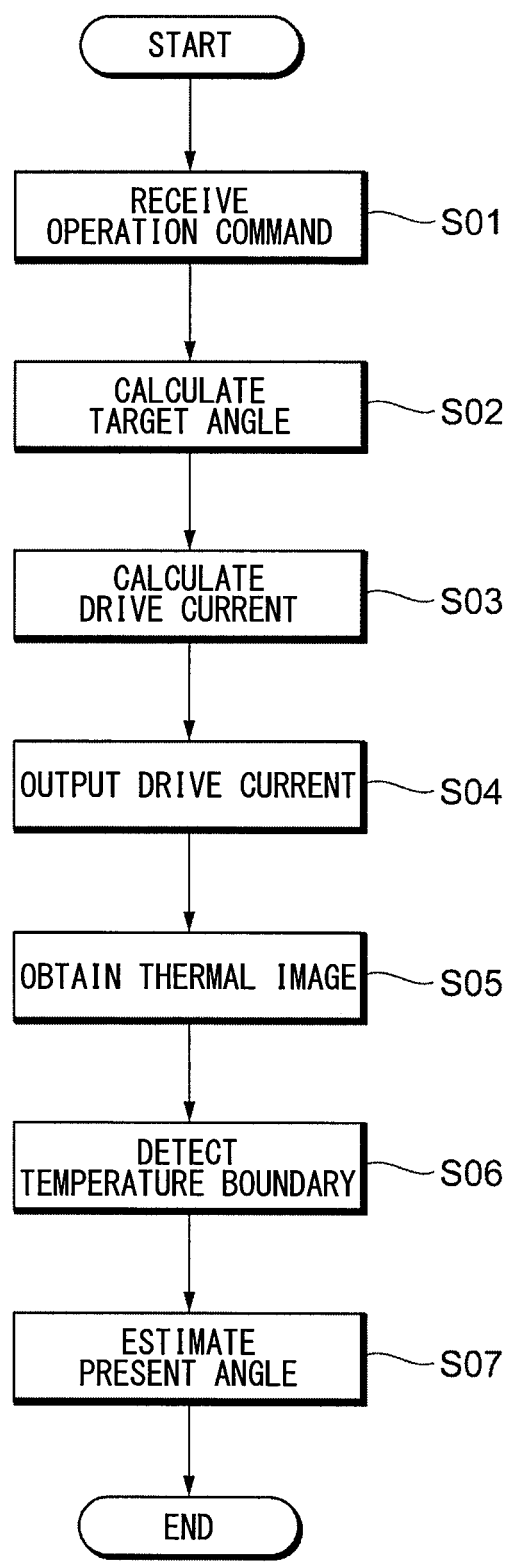
FIG. 4 is a flowchart showing a flow of a processing executed in the occupant detection system.

A specific content of the processing performed by the control device 110 will be described with reference to FIG. 4. The series of processes shown in FIG. 4 is repeatedly executed by the control device 110 each time a predetermined control period elapses.

At S01, the controller 112 performs a process to receive the operation command from the air conditioning ECU 510. The operation command represents the command value for the direction of the infrared temperature sensor 120.

At S02, the controller 112 calculates the target angle. The "target angle" referred to here is the operation amount (that is, the rotation angle) of the photographing position changer 130 necessary to make the direction of the infrared temperature sensor 120 match the direction indicated by the above operation command. The target angle is a relative rotation angle obtained by subtracting the present direction (angle) of the infrared temperature sensor 120 from the direction (angle) of the infrared temperature sensor 120 indicated in the operation command. As the direction of the infrared temperature sensor 120 at the present time, the value of the present angle estimated at S07, which will be described later, in the execution of the series of processes shown in FIG. 4 in the previous control cycle is employed.

At S03 subsequent to S02, the controller 112 calculates the value of the drive current to be supplied to the photographing position changer 130, which is necessary for operating the photographing position changer 130 by the target angle. In the present embodiment, the correspondence relationship between the target angle and the drive current is stored in advance in the storage 113 as a map. The controller 112 calculates the value of the drive current by referring to the map.

At S04 subsequent to S03, the controller 112 performs the process of supplying the drive current to the photographing position changer 130. As a result, the photographing position changer 130 is driven, so that the direction of the infrared temperature sensor 120 is changed. Thus, the direction of the infrared temperature sensor 120 substantially matches the direction indicated by the operation command from the air conditioning ECU 510.

At S05 subsequent to S04, the infrared temperature sensor 120 captures the image, the state detector 111 generates the thermal image 210, and the controller 112 obtains the thermal image 210.

At S06 subsequent to S05, the controller 112 analyzes the thermal image 210, and detects the temperature boundary BD1. Further, the controller 112 calculates the position of the temperature boundary BD1, that is, the distance L1 as described with reference to FIG. 3.

At S07 subsequent to S06, the controller 112 estimates the direction of the infrared temperature sensor 120 at the present time (hereinafter also referred to as "present angle"). As described above, the controller 112 estimates the value of the present angle corresponding to the position (distance L1) of the temperature boundary BD1 by referring to the correspondence relationship stored in the storage 113. The value of the estimated present angle is stored in the storage 113. The value of the estimated present angle is employed in the process for calculating the target angle at S02 when the series of processes shown in FIG. 4 is performed in the next control cycle. That is, in the present embodiment, the value of the present angle estimated at S07 is fed back to control the operation of the photographing position changer 130.

As described above, the controller 112 estimates the attitude (direction) of the infrared temperature sensor 120 based on the information included in the thermal image 210, and controls the operation of the photographing position changer 130 based on the estimated attitude of the infrared temperature sensor 120. Thus, the configuration can accurately control the direction of the infrared temperature sensor 120 even though the rotation angle sensor, such as the resolver, or the like is not employed.

In the present embodiment, the glass G1 and the inner wall W which are arranged to be adjacent to each other are provided at the specific place in the vehicle compartment RM. The boundary between the glass G1 and the inner wall W shown in the thermal image 210 is used as the temperature boundary BD1 for estimating the direction of the infrared temperature sensor 120. The boundary between the glass G1 and the inner wall W appears as the temperature boundary BD1 in the thermal image 210 since the emissivity of the glass G1 and the emissivity of the inner wall W are different from each other.

The glass G1 corresponds to a "first measurement region" in the present embodiment. Further, the inner wall W adjacent on the front side of the glass G1 corresponds to the "second measurement region" in the present embodiment. In the present embodiment, existing structures adjacent to each other in the vehicle compartment RM are used as the first measurement region and the second measurement region as described above. With this configuration, the controller 112 achieves the estimation of the present angle. Structures used as the first measurement region and the second measurement region may be different from those described above.

A second embodiment will be described with reference to FIG. 5. Hereinafter, only parts different from the first embodiment will be described, and description of parts common to the first embodiment will be omitted for explanation as appropriate.

Figure 5:
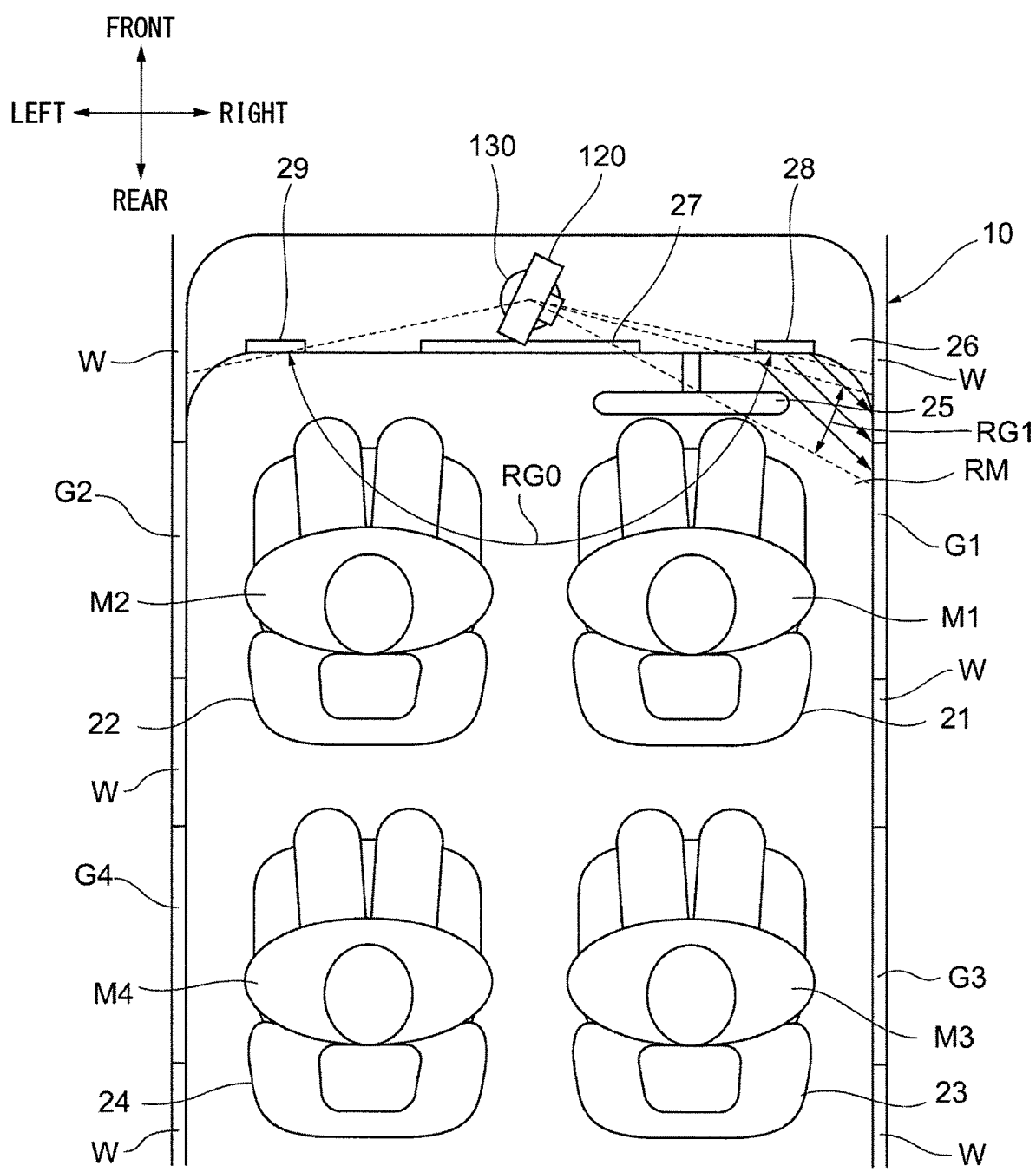
FIG. 5 is a top view diagram schematically showing a vehicle compartment of a vehicle to which an occupant detection system according to a second embodiment is attached.

In FIG. 5, the infrared temperature sensor 120 is in the state of turning to the right further than the driver M1. At this time, the imaging region inside the range RG1 includes the glass G1 by the driver's seat 21 and the inner wall W adjacent on the front side of the glass G1. In such a state, at a time immediately before the infrared temperature sensor 120 captures the image, the blowout port 28 blows low-temperature conditioned air toward the imaging region. That is, the conditioned air is blown to both the glass G1 and the inner wall W adjacent on the front side of the glass G1.

The specific heat of the glass G1 is larger than the specific heat of the inner wall W. Thus, when the conditioned air is blown as described above, the difference between the temperature of the glass G1 and the temperature of the inner wall W becomes large. As a result, the difference between the temperature of the region 211 and the temperature of the region 212 shown in the thermal image 210 of FIG. 3 becomes large. Thus, the temperature boundary BD1 in the thermal image 210 becomes clearer, so that it is possible to estimate the direction of the infrared temperature sensor 120 based on the position of the temperature boundary BD1 more reliably and accurately.

Figure 6:
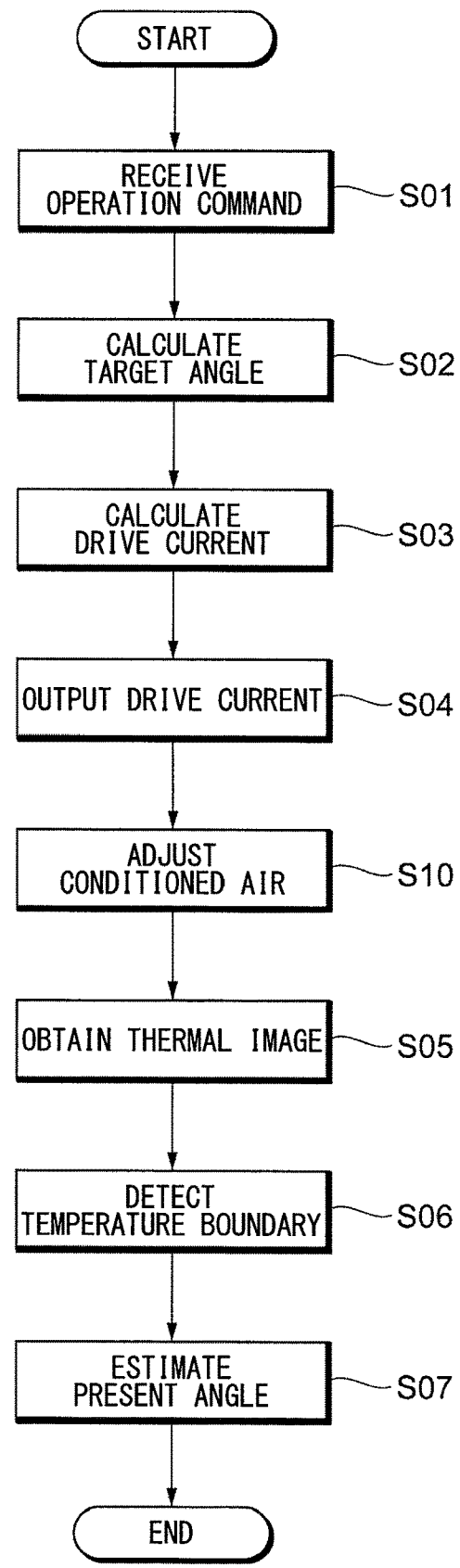
FIG. 6 is a flowchart showing a flow of a processing executed in the occupant detection system.

A specific content of the processing executed by the control device 110 will be described with reference to FIG. 6. Among the processes shown in FIG. 6, the similar processes as the processes shown in FIG. 4 are given the same reference numerals in FIG. 4 ("S01", or the like). In the series of processing shown in FIG. 6, S10 is executed between S04 and S05. The difference between the processing shown in FIG. 6 and the processing shown in FIG. 4 is the operation of S10.

When the process of S04 is executed, so that the direction of the infrared temperature sensor 120 is changed by the drive of the photographing position changer 130, the process proceeds to S10. At S10, the controller 112 transmits a control signal to the air conditioning ECU 510. With this configuration, the operation of the vehicle air conditioner 500 is changed. Specifically, opening and closing of a door (not shown) provided in the interior of the vehicle air conditioner 500 is switched so that the air conditioning air is blown out from the blowout port 28. Further, the direction of a louver (not shown) provided in the blowout port 28 is changed so that the conditioned air blown out from the blowout port 28 is directed to the present imaging region. Further, the operation of the refrigeration cycle (not shown) is controlled so that the temperature of the conditioned air blown out becomes low.

When a predetermined time has elapsed after the process of S10 has been executed, the process proceeds to S05. The predetermined time is previously set as a time required for the temperature of the glass G1 and the inner wall W to be lowered so that the conditioned air hits the glass G1 and the inner wall W included in the imaging region. With the process as described above, the temperature boundary BD1 in the thermal image 210 becomes clearer.

The vehicle air conditioner 500 according to the present embodiment functions as a "temperature adjuster" that generates the temperature boundary by blowing the conditioned air to a specific part in the vehicle compartment RM in order to change the temperature of the part. Another device other than the vehicle air conditioner 500 may be employed as the temperature adjuster. For example, a heating element (for example, an electric heater) may be arranged at a specific position in the vehicle compartment RM. The temperature of the heating element is made higher than the ambient temperature so as to generate a temperature boundary along the outer shape of the heating element. For example, a heat absorbing element (for example, a Peltier element) may be arranged at a specific position in the vehicle compartment RM. The temperature of the heat absorbing element is made lower than the ambient temperature so as to generate a temperature boundary along the outer shape of the heating element.

A third embodiment will be described with reference to FIG. 7. Hereinafter, only parts different from the first embodiment will be described, and description of parts common to the first embodiment will be omitted for explanation as appropriate.

In the present embodiment, members 301, 302, 303, and 304 are attached to a plurality of specific places in the vehicle compartment RM. Each of the members 301 to 304 is made of metal such as aluminum, and has a plate shape. The emissivity of each of the members 301 to 304 is smaller than the emissivity of the members (inner wall W and the like to which the members 301 to 304 are attached) around the members 301 to 304.

The member 301 is attached to the inner wall W on the front side of the glass G1. The member 302 is attached to the front side of the driver's seat 21 at a position close to the left. The member 303 is attached to the front side of the front passenger seat 22 at a position close to the right. The member 304 is attached to the inner wall W on the front side of the glass G2.

Figure 7:
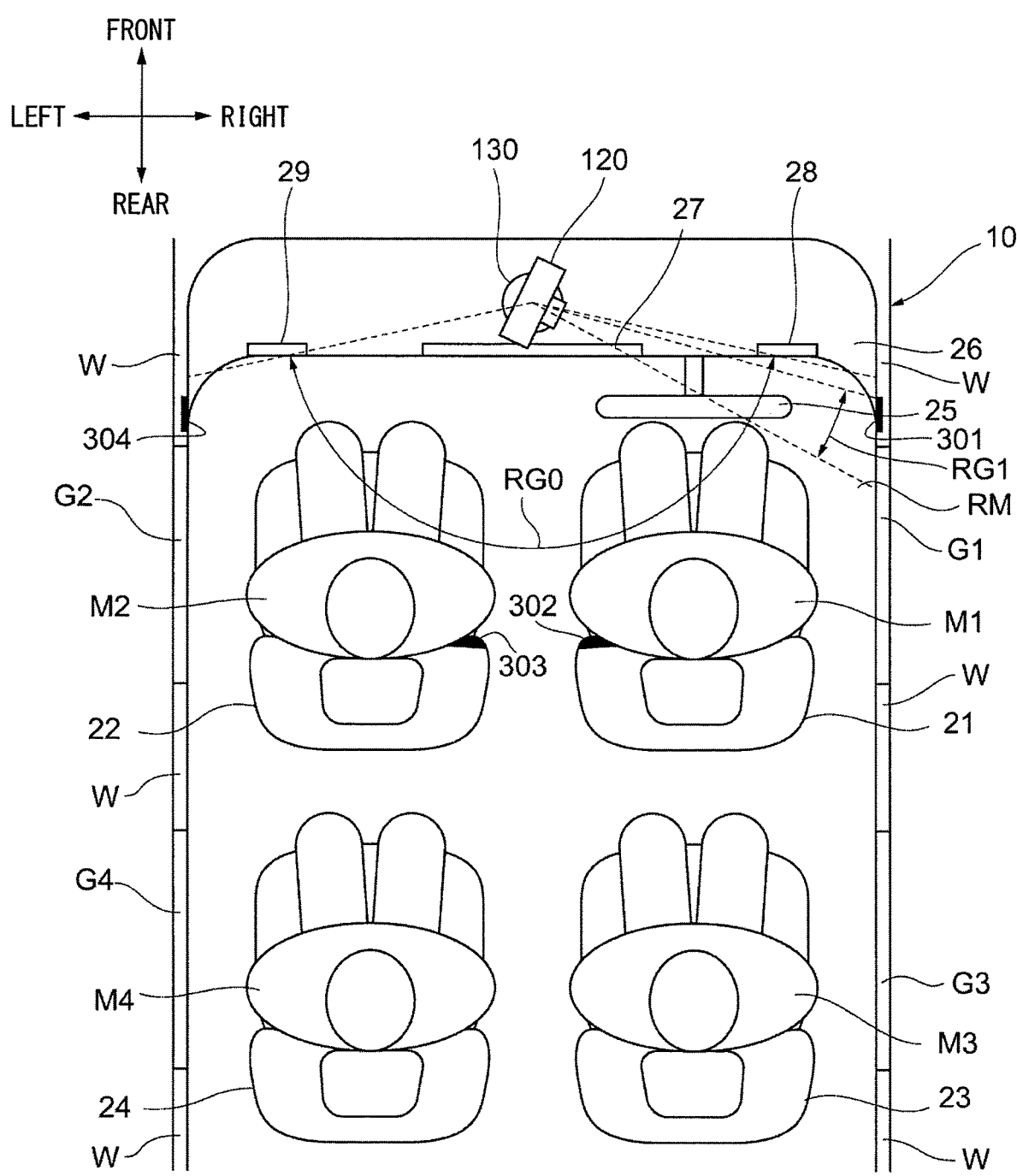
FIG. 7 is a top view diagram schematically showing a vehicle compartment of a vehicle to which an occupant detection system according to a third embodiment is attached.

In FIG. 7, the infrared temperature sensor 120 is in the state of turning to the right further than the driver M1. At this time, the imaging region inside the range RG1 includes the glass G1 by the driver's seat 21, the inner wall W adjacent on the front side of the glass G1, and the member 301.

Figure 8:
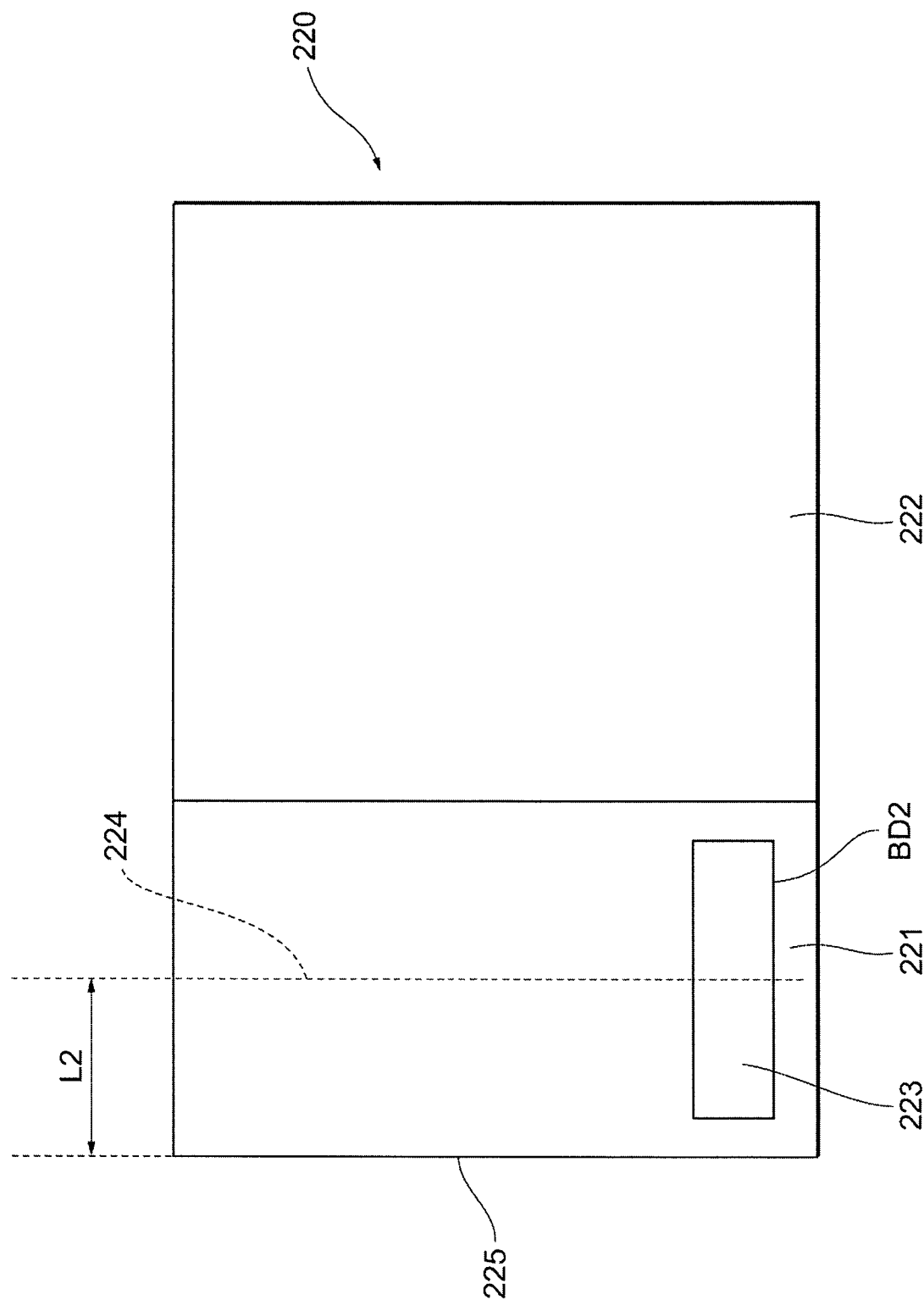
FIG. 8 is a diagram showing an example of a generated thermal image.

FIG. 8 shows an example of the thermal image 220 captured by the infrared temperature sensor 120 and generated by the state detector 111 when the direction of the infrared temperature sensor 120 is directed as shown in FIG. 7. In the thermal image 220, the temperature of the inner wall W is shown in the region 221 on the left side in FIG. 8 and the temperature of the glass G1 is shown in the region 222 on the right side in FIG. 8. Further, in the region 223 in the region 221, the temperature of the member 301 is shown.

The emissivity of the member 301 is smaller than the emissivity of the inner wall W to which the member 301 is attached. Therefore, even when the actual temperature of the inner wall W and the actual temperature of the member 301 are the same, the two temperatures shown in the thermal image 220 will be different from each other. Specifically, the thermal image 220 is generated such that the temperature of the member 301 shown in the region 223 is lower than the temperature of the inner wall W shown in the region 221. As a result, a temperature boundary BD2, which has the same shape as the member 301, is formed between the region 221 and the region 223 in the thermal image 220. The temperature boundary BD2 corresponds to the boundary between inner wall W and the member 301.

The correspondence relationship between the distance L2 from the left end 225 of the thermal image 220 to the center of the temperature boundary BD2 and the direction of the infrared temperature sensor 120 at the time of capturing the image is uniquely determined according to the arrangement of the infrared temperature sensor 120, the member 301. The storage 113 stores such a correspondence relationship in advance. In the present embodiment similar to the first embodiment, the controller 112 estimates the direction of the infrared temperature sensor 120 based on the correspondence relationship.

The same applies to the members 302, 303, 304. The storage 113 stores the correspondence relationship for each of the members 302, 303, 304 between the center position of the temperature boundary and the direction of the infrared temperature sensor 120 at the time of capturing the image. Therefore, when any of the members 301 to 304 is included in the thermal image, the controller 112 can estimate the direction of the infrared temperature sensor 120.

The number of members 301 and the like attached in the vehicle compartment RM need not be limited to four as in the present embodiment, and can be changed as appropriate. For example, even when the infrared temperature sensor 120 is directed to any direction, the thermal image to be captured by the infrared temperature sensor 120 includes any one of the members 301 and the like. In this configuration, the controller 112 can estimate the direction of the infrared temperature sensor 120 any time.

The shapes of the members 301 and the like are preferably different from each other. In this configuration, the controller 112 can accurately identify one of the members 301 and the like included in the thermal image based on the shape of the temperature boundary included in the thermal image. Thus, the controller 112 can more accurately estimate the direction of the infrared temperature sensor 120.

The region of the surface of each of the members 301 and the like corresponds to a "first measurement region" in the present embodiment. Further, members (inner wall W, driver's seat 21 and the like) adjacent to the members 301 and the like correspond to a "second measurement region" in the present embodiment.

That is, in the present embodiment, one of the first measurement region and the second measurement region corresponds to the member 301 or the like that is additionally attached in the vehicle compartment RM. The other one of the first measurement region and the second measurement region corresponds to the existing structure in the vehicle compartment RM.

In this configuration, the member 301 or the like whose emissivity is significantly different from emissivity of the member around the member 301 or the like is employed. Thus, the temperature boundary BD2 in the thermal image 220 can be made clearer. As a result, it is possible to estimate the direction of the infrared temperature sensor 120 based on the position of the temperature boundary BD2 more reliably and accurately.

In the present embodiment, the center position is used as the position of the temperature boundary BD2, but another position may be used as the position of the temperature boundary. For example, the position of the left end of the temperature boundary BD2 in FIG. 8 may be used as the position of the temperature boundary BD2.

Each of the members 301 and the like may have a plate shape as in the present embodiment, but may have, for example, a soft sheet shape attached to the inner wall W or the like.

A fourth embodiment will be described with reference to FIG. 9. Hereinafter, only parts different from the first embodiment will be described, and description of parts common to the first embodiment will be omitted for explanation as appropriate.

The infrared temperature sensor 120 and the photographing position changer 130 according to the present embodiment are entirely housed inside a case 150. The case 150 is constituted as a container made of, for example, metal, and has a substantially rectangular shape.

The case 150 includes a top plate 155 (not shown), a bottom plate 156, a rear plate 151, a front plate 152, and side plates 153 and 154. The top plate 155 is a portion that covers the infrared temperature sensor 120 and the like from the upper side. The bottom plate 156 is a portion arranged to face the top plate 155, and is arranged on the bottom of the infrared temperature sensor 120 and the like (the back side of the drawing of FIG. 9).

The rear plate 151 is a portion perpendicular to each of the top plate 155 and the bottom plate 156. The rear plate 151 is arranged at the rear side of the infrared temperature sensor 120 and the like, that is, between the infrared temperature sensor 120 and the like and the driver's seat 21 and the like. The front plate 152 is a portion arranged to face the rear plate 151, and is arranged in front of the infrared temperature sensor 120 and the like.

The side plate 153 is a portion perpendicular to each of the top plate 155, the bottom plate 156, the rear plate 151, and the front plate 152, and is arranged on the right of the infrared temperature sensor 120 and the like. The side plate 154 is a portion arranged to face the side plate 153, and is arranged on the left of the infrared temperature sensor 120 and the like.

A rectangular opening is formed in the rear plate 151, and a transparent plate 159 is fitted in this opening. The transparent plate 159 is made of a material transparent to infrared light (for example, glass). The transparent plate 159 suppresses intrusion of foreign matter into the inside of the case 150, while transmission of infrared light is allowed. Detection of surface temperature by the infrared temperature sensor 120, that is, reception of infrared light is performed through the transparent plate 159.

However, depending on the direction of the infrared temperature sensor 120, part of the infrared light emitted from the object included in the range RG1 may be blocked by the side plate 153 or the like and may not reach the infrared temperature sensor 120. In FIG. 9, the infrared temperature sensor 120 is directed to the right, and a state in which a part of each of the rear plate 151 and the side plate 153 is in the range RG1 is shown.

When the infrared temperature sensor 120 captures the image in the state shown in FIG. 9, the generated thermal image is similar to the thermal image 210 shown in FIG. 3. Referring back to FIG. 3, in the thermal image 210, the temperature of the rear plate 151 and the side plate 153 is shown in the left region 211, and the temperature of the object ahead of the transparent plate 159 is shown in the right region 212.

The emissivity of the rear plate 151, the side plate 153, and the like in the case 150 is smaller than the emissivity of members (inner wall W and the like) in the vehicle compartment RM. Therefore, even when the actual temperature of the inner wall W or the like and the actual temperature of the rear plate 151 or the like are the same, the two temperatures shown in the thermal image 210 will be different from each other. Specifically, the thermal image 220 is generated such that the temperature of the side plate 153 shown in the region 211 is lower than the temperature of the inner wall W or the like shown in the region 212. As a result, the temperature boundary BD1 is formed at the position between the region 211 and the region 212 shown in FIG. 3.

The temperature boundary BD1 is the temperature boundary that is formed when the end of the opening formed in the rear plate 151 is captured. The correspondence relationship between the position of the temperature boundary BD1 and the direction of the infrared temperature sensor 120 is stored in the storage 113 in advance.

As described above, in the present embodiment, one of the first measurement region and the second measurement region corresponds to a part of the case 150, and the other corresponds to an object in the vehicle compartment RM (object arranged outside the case 150 and ahead of the transparent plate 159). Even in the above configuration, the similar advantages as those of the first embodiment can be obtained.

In the first embodiment, for example, a part of the occupant's body or the like may be present between the first measurement region and the second measurement region, and the infrared temperature sensor 120. In this case, the infrared light emitted from the vicinity of the temperature boundary is blocked by the occupant or the like, so that there is a possibility that the direction of the infrared temperature sensor 120 based on the thermal image is not accurately estimated.

On the other hand, in the present embodiment, an obstacle that blocks infrared light does not exist between one of the first measurement region and the second measurement region (specifically, a part of the case 150) and the infrared temperature sensor 120. Since the infrared light emitted from the vicinity of the temperature boundary is not blocked, it is possible to estimate the direction of the infrared temperature sensor 120 any time based on the thermal image.

In the present embodiment, only one of the first measurement region and the second measurement region is a part of the case 150. Alternatively, both of the first measurement region and the second measurement region are the part of the case 150. For example, the emissivity of the rear plate 151 and the emissivity of the side plate 153 may be configured to be different from each other. In this case, the boundary between the rear plate 151 and the side plate 153 is drawn as a temperature boundary in the thermal image.

A fifth embodiment will be described with reference to FIG. 10. Hereinafter, only parts different from the first embodiment will be described, and description of parts common to the first embodiment will be omitted for explanation as appropriate.

The infrared temperature sensor 120 and the photographing position changer 130 according to the present embodiment are entirely housed inside a case 150, similarly to the fourth embodiment shown in FIG. 9. A plurality of markers 310 are formed on the inner surface of the transparent plate 159. Each marker 310 is a metal layer formed by vapor deposition, and is formed on the lower side of the transparent plate 159 so as to be aligned in a left-right direction. When the infrared temperature sensor 120 captures the image, the generated thermal image includes a region indicating the temperature of some of the plurality of markers 310. Which marker 310 is included in the thermal image depends on the direction of the infrared temperature sensor 120.

Figure 10:
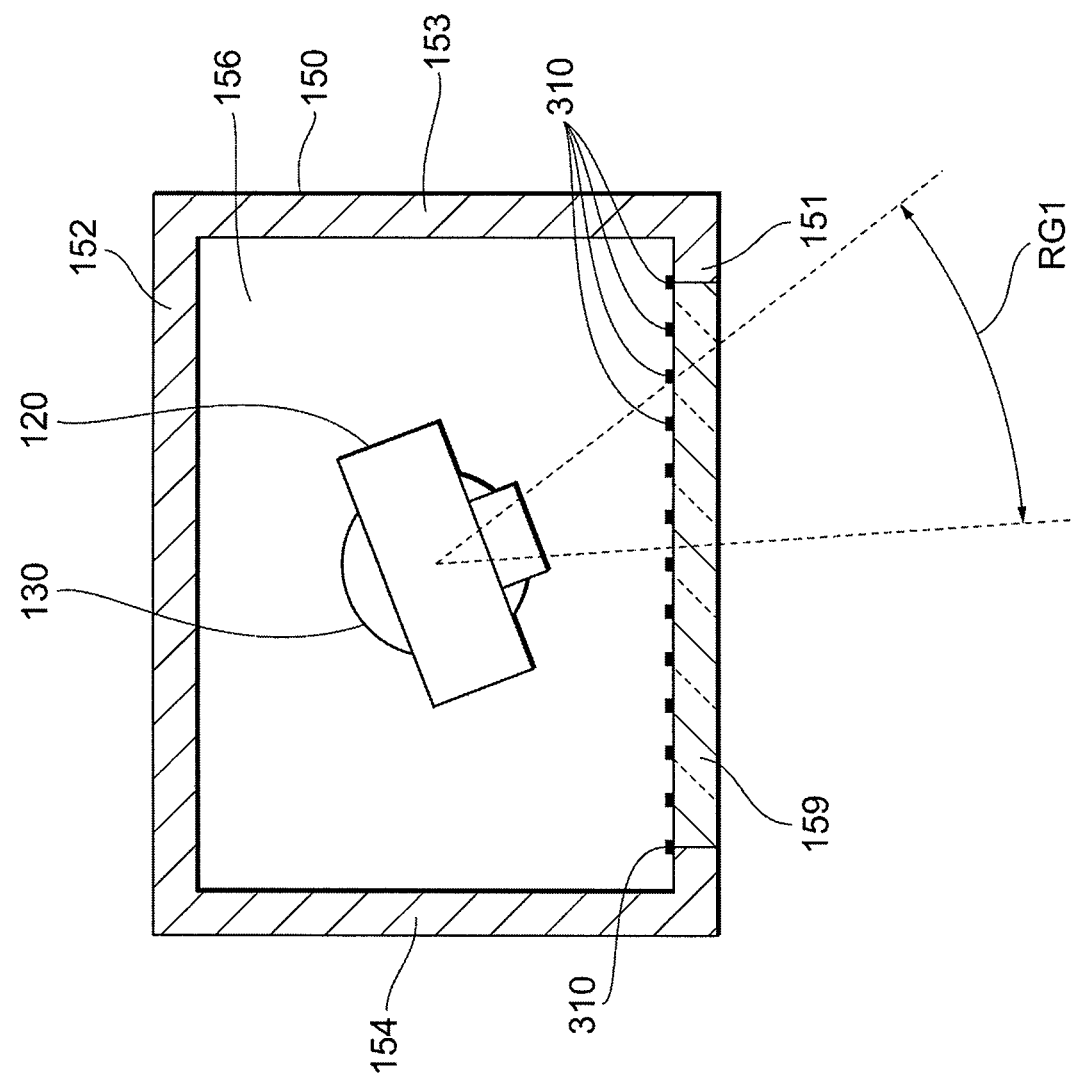
FIG. 10 is a diagram schematically showing a configuration of an infrared temperature sensor and a periphery of the infrared temperature sensor in an occupant detection system according to a fifth embodiment.
Figure 11:
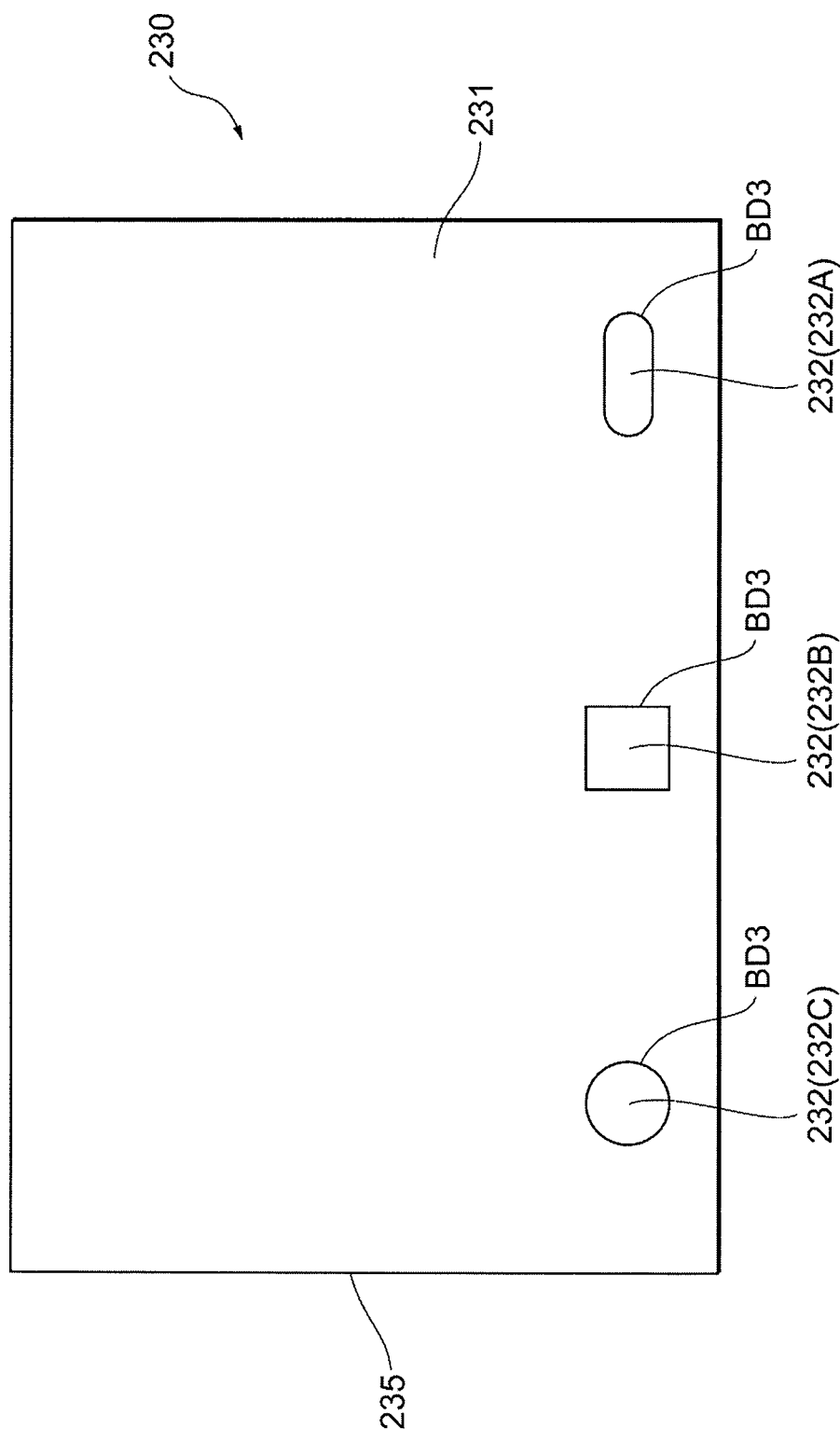
FIG. 11 is a diagram showing an example of a generated thermal image.

FIG. 11 shows an example of the thermal image 230 captured by the infrared temperature sensor 120 and generated by the state detector 111 when the direction of the infrared temperature sensor 120 is directed as shown in FIG. 10. The range RG1 at the time of capturing the image includes three of the plurality of markers 310, and in the lower side of the thermal image 230, regions 232 indicating the temperatures of the respective three of the plurality of markers 310 are arranged in a line. A region 231 outside of each region 232 is a region indicating the temperature of an object located ahead of the transparent plate 159.

The emissivity of each of the markers 310 is smaller than the emissivity of members (inner wall W and the like) in the vehicle compartment RM. Therefore, even when the actual temperature of the inner wall W or the like and the actual temperature of each of the markers 310 are the same, the two temperatures shown in the thermal image 230 will be different from each other. Specifically, the thermal image 230 is generated such that the temperature of each of the markers 310 shown in the region 232 is lower than the temperature of the inner wall W or the like shown in the region 231. As a result, a temperature boundary BD3, which has the same shape as each of the markers 310, is formed between the region 231 and the region 232 in the thermal image 230. The temperature boundary BD3 corresponds to the boundary between inner wall W or the like and each of the markers 310.

The correspondence relationship between the distance from the left end 235 of the thermal image 230 to the center of each of the temperature boundaries BD3 (that is, the position of each of the temperature boundaries BD3) and the direction of the infrared temperature sensor 120 at the time of capturing the image is uniquely determined according to the arrangement of the infrared temperature sensor 120 and the each of the markers 310. The storage 113 stores such a correspondence relationship in advance. In the present embodiment similar to the first embodiment, the controller 112 estimates the direction of the infrared temperature sensor 120 based on the correspondence relationship.

In the present embodiment, the shapes of the respective markers 310 are different from each other, and each has a unique shape. As a result, among the three regions 232 shown in FIG. 11, the right region 232A has a laterally long ellipse shape, the center region 232B has a square shape, and the left region 232C has a circle shape. The correspondence relationship stored in the storage 113 is stored as a set with the shape of each marker 310. Therefore, even when a plurality of temperature boundaries BD3 are formed in one thermal image 230 as shown in FIG. 11, the controller 112 is capable of specifying the plurality of the markers 310 corresponding to the respective temperature boundaries BD3. As a result, it is possible to accurately estimate the direction of the infrared temperature sensor 120 based on the correspondence relationship stored in the storage 113.

Alternatively, when the plurality of the markers 310 have the same shape, each arrangement pitch for adjacent two of the plurality of the markers 310 is set to be nonuniform. Even in this configuration, the controller 112 can identify the individual markers 310.

As described above, in the present embodiment, one of the first measurement region and the second measurement region corresponds to the markers 310 (a part of the case 150), and the other corresponds to an object in the vehicle compartment RM (object arranged outside of the case 150 and ahead of the transparent plate 159). Even in the above configuration, the similar advantages as those of the first embodiment can be obtained.

Further, in the present embodiment, the infrared temperature sensor 120 is arranged so as that the captured thermal image includes any one of the plurality of the markers 310 regardless of the direction of the infrared temperature sensor 120. Thus, the plurality of markers 310 are arranged along the swing direction (left-right direction) of the infrared temperature sensor 120. With this configuration, since the controller 112 can estimate the direction of the infrared temperature sensor 120 any time, adjustment of the direction of the infrared temperature sensor 120 can be performed with high resolution.

In the present embodiment, the center position is used as the position of the temperature boundary BD3, but another position may be used as the position of the temperature boundary BD3. For example, the position of the left end of the temperature boundary BD3 in FIG. 11 may be used as the position of the temperature boundary BD3.

A sixth embodiment will be described with reference to FIG. 12. Hereinafter, only parts different from the first embodiment will be described, and description of parts common to the first embodiment will be omitted for explanation as appropriate.

The infrared temperature sensor 120 and the photographing position changer 130 according to the present embodiment are entirely housed inside a case 150, similarly to the fourth embodiment shown in FIG. 9. In the present embodiment, a plurality of infrared light emitters LS1, LS2, LS3, LS4 are arranged in the vehicle compartment RM. The positions of the plurality of infrared light emitters LS1, LS2, LS3, LS4 are respectively arranged at the same positions at which the plurality of members 301, 302, 303, 304 are arranged in the third embodiment (FIG. 7).

The plurality of infrared light emitters LS1, LS2, LS3, LS4 are constituted by LEDs that can emit infrared light. Each of the plurality of infrared light emitters LS1, LS2, LS3, LS4 is arranged such that the emitted infrared light reaches the infrared temperature sensor 120 through the transparent plate 159. In FIG. 12, the optical path of the infrared light emitted from each of the plurality of infrared light emitters LS1, LS2, LS3, LS4 is indicated by an arrow. Each of the plurality of infrared light emitters LS1, LS2, LS3, LS4 emits infrared light from a specific position in the vehicle compartment RM to the infrared temperature sensor 120, and corresponds to an "emitter" in the present embodiment. The controller 112 controls the start and stop of infrared emission in the plurality of infrared light emitters LS1, LS2, LS3, LS4.

Figure 12:
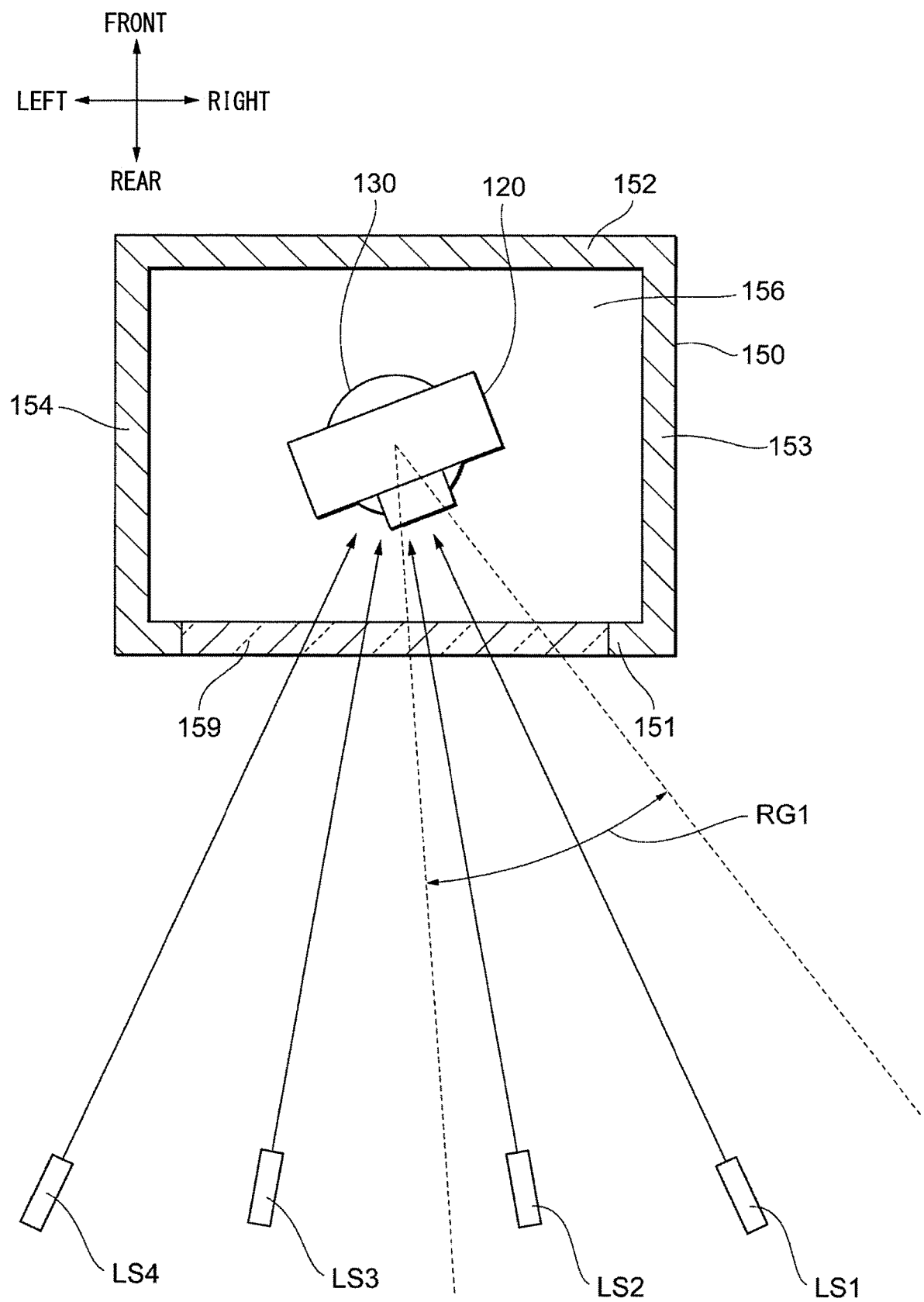
FIG. 12 is a diagram schematically showing a configuration of an infrared temperature sensor and a periphery of the infrared temperature sensor in an occupant detection system according to a sixth embodiment.
Figure 13:
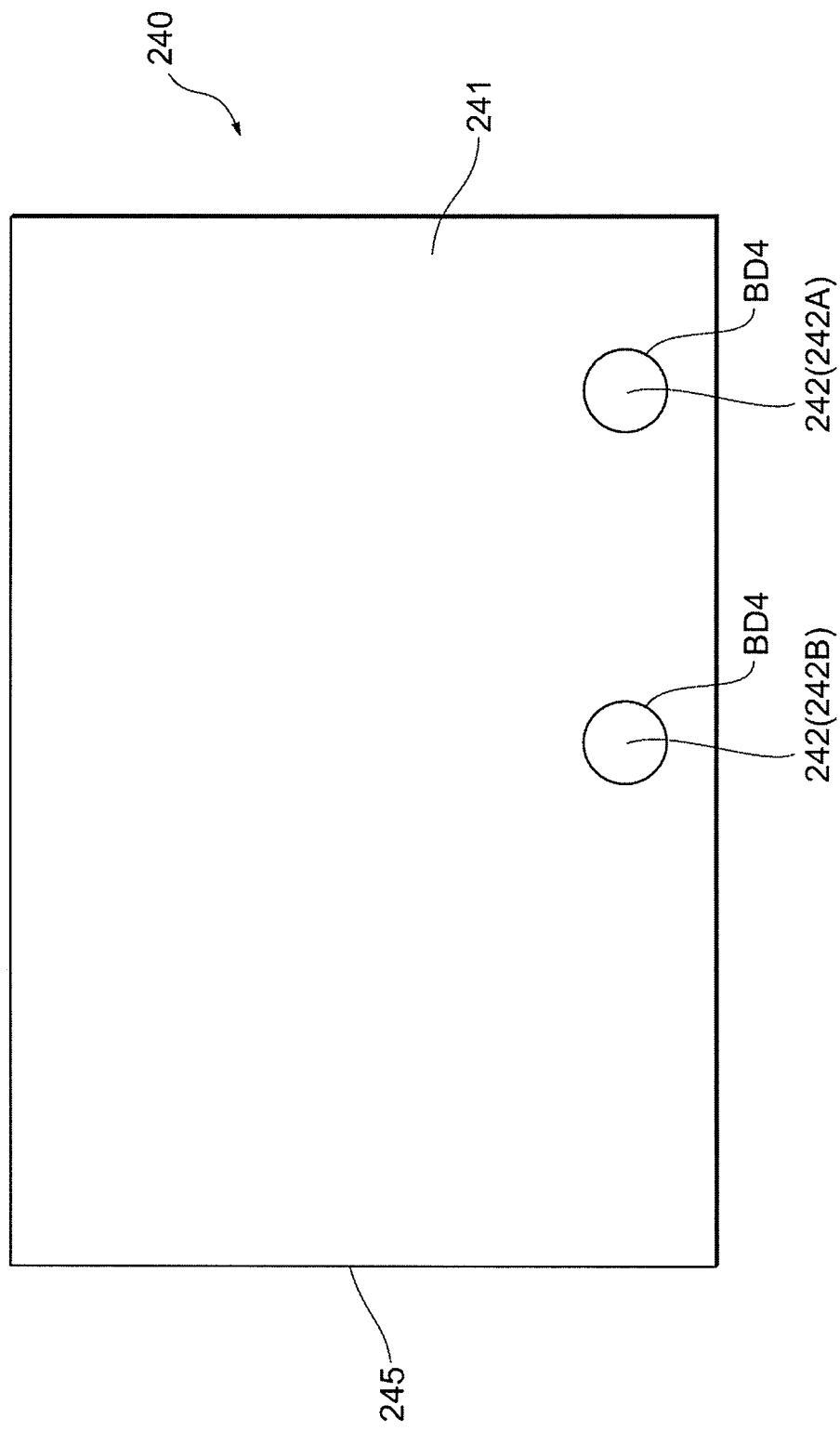
FIG. 13 is a diagram showing an example of a generated thermal image.

FIG. 13 shows an example of the thermal image 240 captured by the infrared temperature sensor 120 and generated by the state detector 111 when the direction of the infrared temperature sensor 120 is directed as shown in FIG. 12. The range RG1 at the time of capturing the image includes two infrared light emitters LS1, LS2. Therefore, on the lower side of the thermal image 240, two regions 242 are formed due to the infrared radiation.

A region 242A formed on the right in FIG. 13 is a region shown so that the temperature is different from the temperature of the other area 241 in the thermal image 240 due to the arrival of the infrared light emitted from the infrared light emitter LS2. A region 242B formed on the left in FIG. 13 is a region shown so that the temperature is different from the temperature of the other area 241 in the thermal image 240 due to the arrival of the infrared light emitted from the infrared light emitter LS1.

As a result, a plurality of temperature boundaries BD4 having the same shape (in the embodiment, a circle) as the cross section of the infrared light emitted from the corresponding infrared light emitters LS1 and the like are formed between the region 241 and the regions 242 in the thermal image 240. Each of the plurality of temperature boundaries BD4 corresponds to the boundary between corresponding one of the plurality of infrared light emitters LS1, LS2, LS3, LS4 and the periphery thereof.

The correspondence relationship between the distance from the left end 245 of the thermal image 240 to the center of each of the plurality of temperature boundaries BD4 (that is, the position of each of the plurality of temperature boundaries BD4) and the direction of the infrared temperature sensor 120 at the time of capturing the image is uniquely determined according to the arrangement of the infrared temperature sensor 120 and the plurality of infrared light emitters LS1, LS2, LS3, LS4. The storage 113 stores such a correspondence relationship in advance. In the present embodiment similar to the first embodiment, the controller 112 estimates the direction of the infrared temperature sensor 120 based on the correspondence relationship.

In the present embodiment, the cross sectional shapes of the infrared light emitted from the plurality of infrared light emitters LS1, LS2, LS3, LS4 are the same. Alternatively, the cross sectional shapes of the infrared light emitted from the plurality of infrared light emitters LS1, LS2, LS3, LS4 may be different from each other. In this case, even when the plurality of temperature boundaries BD4 are formed in one thermal image 240 as shown in FIG. 13, the controller 112 is capable of specifying the plurality of the infrared light emitters LS1, LS2, LS3, LS4 corresponding to the plurality of temperature boundaries BD4. As a result, it is possible to accurately estimate the direction of the infrared temperature sensor 120 based on the correspondence relationship stored in the storage 113.

Alternatively, even though the cross sectional shapes of the infrared lights emitted from the plurality of the infrared light emitters LS1, LS2, LS3, LS4 is the same with each other, the plurality of the infrared light emitters LS1, LS2, LS3, LS4 are arranged so as that each arrangement pitch for adjacent two of the plurality of temperature boundaries BD4 is set to be nonuniform. Even in such a configuration, the controller 112 can identify the plurality of the infrared light emitters LS1, LS2, LS3, LS4.

In the present embodiment, the temperature boundary BD4 in the thermal image 240 can be made clearer by, for example, increasing the intensity of the infrared light emitted from each of the plurality of the infrared light emitters LS1, LS2, LS3, LS4. As a result, it is possible to estimate the direction of the infrared temperature sensor 120 based on the position of the temperature boundary BD4 more reliably and accurately.

In the present embodiment, the center position is used as the position of the temperature boundary BD4, but another position may be used as the position of the temperature boundary BD4. For example, the position of the left end of the temperature boundary BD4 in FIG. 13 may be used as the position of the temperature boundary BD4.

Alternatively, the emission of the infrared light from the infrared light emitters LS1 and the like may be performed throughout the period for which the occupant detection system 100 detects the surface temperature. However, in the present embodiment, the emission of the infrared light from the infrared light emitter LS1 or the like is stopped at a predetermined time point.

Figure 14:
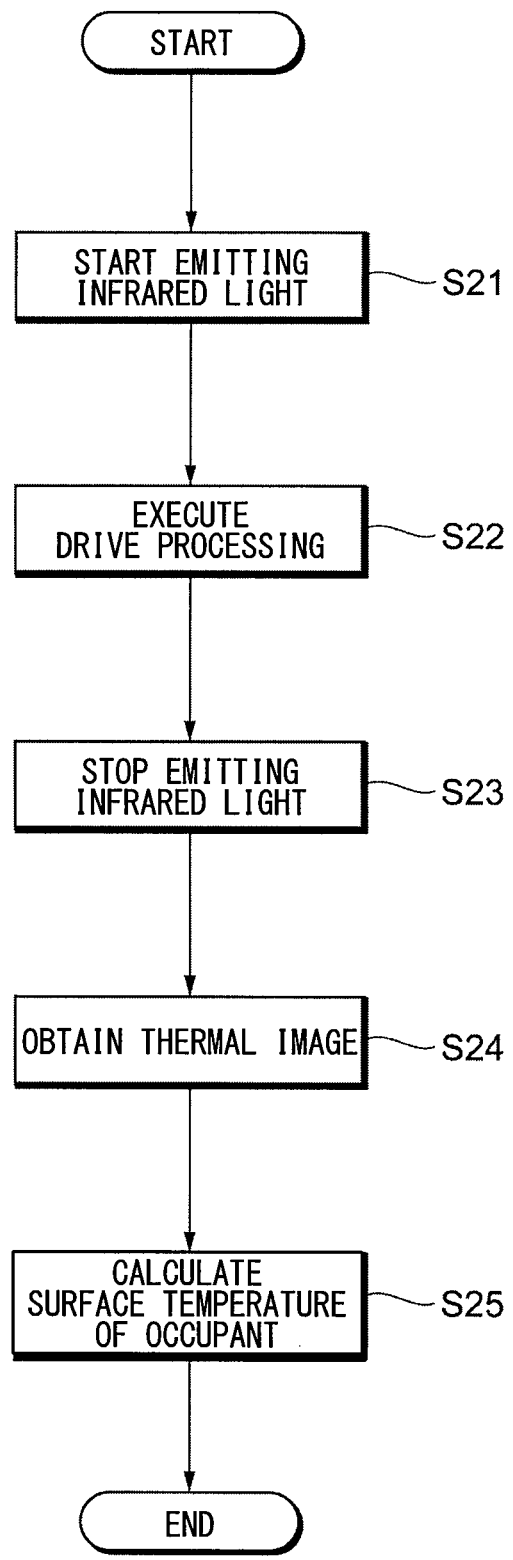
FIG. 14 is a flowchart showing a flow of a processing executed in the occupant detection system.

A specific content of the processing executed by the control device 110 will be described with reference to FIG. 14. The series of processes shown in FIG. 14 is repeatedly executed by the control device 110 each time a predetermined period elapses.

At S21, the control device 110 causes all of the infrared light emitters LS1 and the like to start emitting the infrared light. At S22 subsequent to S21, the control device 110 drives the photographing position changer 130, so that the direction of the infrared temperature sensor 120 is changed. The process at S22 is similar to the processing shown in FIG. 4 of the first embodiment. That is, the process is to estimate the direction of the infrared temperature sensor 120 based on the position of the temperature boundary BD4 in the thermal image 240, and to control the operation of the photographing position changer 130 based on the estimated direction.

When the process at S22 ends and the direction of the infrared temperature sensor 120 substantially matches the direction indicated by the operation command, the process proceeds to S23. At S23, the control device 110 stops the emission of infrared light in all of the infrared light emitters LS1 and the like. As a result, the infrared light from the infrared light emitters LS1 and the like no longer reaches the infrared temperature sensor 120, and the infrared light emitted from an object (such the inner wall W) in the vehicle compartment RM reaches.

At S24 subsequent to S23, the infrared temperature sensor 120 captures the image, the state detector 111 generates the thermal image 210, and the controller 112 obtains the thermal image 210.

At S25 subsequent to S24, the controller 112 calculates the information indicative of temperature including the surface temperature of the occupant based on the thermal image obtained at S24. The information is transmitted from the controller 112 to the air conditioning ECU 510. The air conditioning ECU 510 controls the operation of the vehicle air conditioning device 500 based on the information, and adjusts the wind direction, temperature, and the like of the air conditioning wind so that the interior of the vehicle compartment RM becomes comfortable.

As described above, in the present embodiment, when the controller 112 does not estimate the attitude of the infrared temperature sensor 120, the emission of the infrared light from the infrared light emitters LS1 and the like is temporarily stopped. As a result, it is possible to avoid the situation where the infrared light emitted from the infrared light emitter LS1 and the like affects the temperature measurement of each part in the vehicle compartment RM. With this configuration, the temperature of each part in the vehicle compartment RM can be measured with high accuracy.

The infrared light emitters LS1 and the like may be arranged outside the case 150 as in this embodiment, but may be arranged inside the case 150.

A seventh embodiment will be described with reference to FIG. 15. Hereinafter, only parts different from the first embodiment will be described, and description of parts common to the first embodiment will be omitted for explanation as appropriate.

The infrared temperature sensor 120 and the photographing position changer 130 according to the present embodiment are entirely housed inside a case 150, similarly to the fourth embodiment shown in FIG. 9. In the present embodiment, one infrared light emitter LS10 is arranged in the vehicle compartment RM. The infrared light emitter LS10 is installed on the upper surface of the instrument panel 26 (not shown in FIG. 15), and emits infrared light from the position toward reflection plates RF1, RF2 as will be described below. The infrared light emitter LS10 corresponds to an "emitter" in the present embodiment. The controller 112 controls the start and stop of infrared emission in the infrared light emitter LS10.

The reflection plates RF1, RF2 are arranged in the passenger compartment RM. The positions of the reflection plates RF1, RF2 are the same as the positions at which the members 302, 303 are arranged in the third embodiment (FIG. 7), respectively. Each of the reflection plates RF1, RF2 has a flat plate shape, and is configured as a mirror that reflects all infrared light incident from the outside. Each of the reflection plates RF1, RF2 is adjusted in the direction so as to reflect the infrared light from the infrared light emitter LS10 toward the infrared temperature sensor 120.

Figure 15:
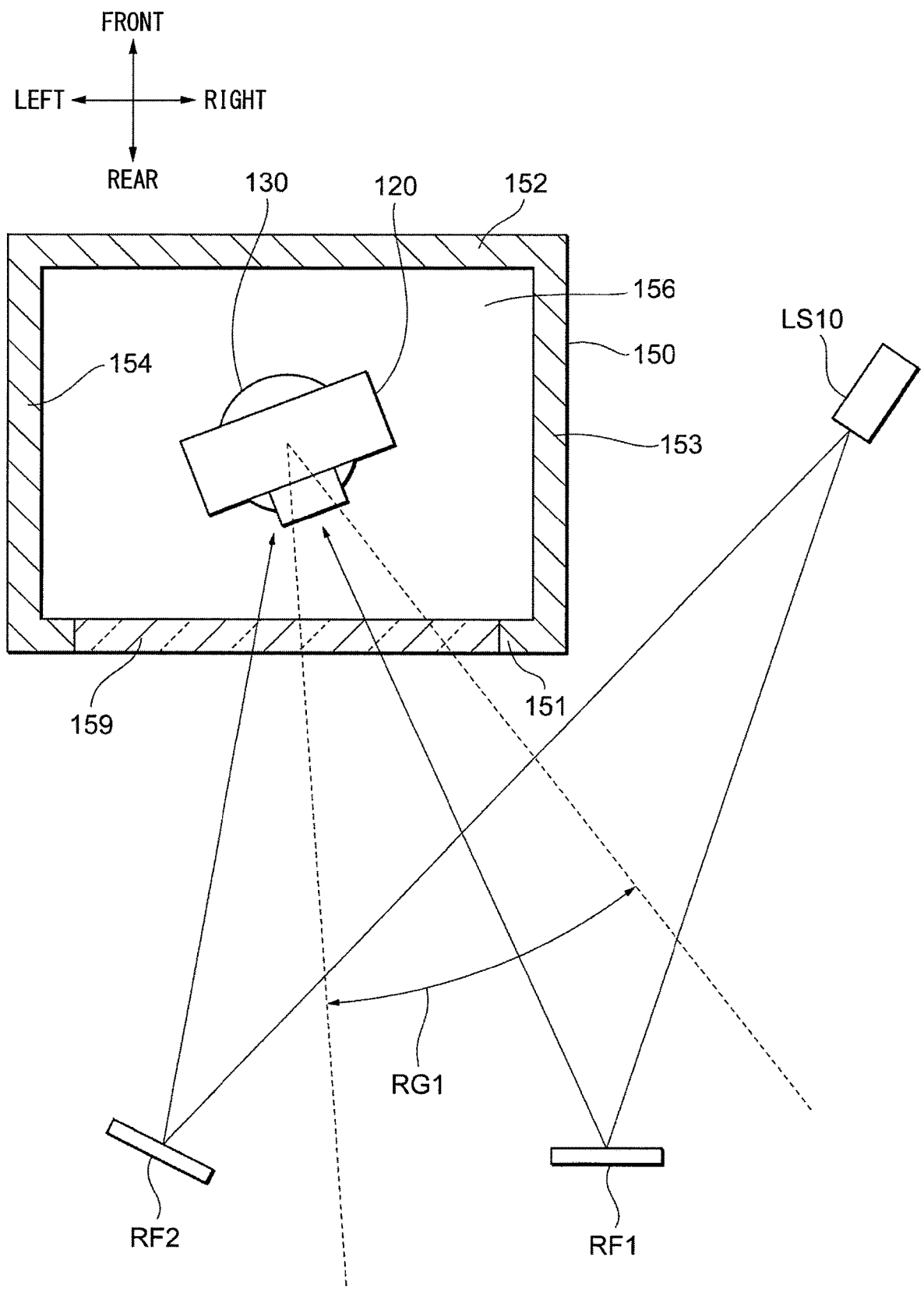
FIG. 15 is a diagram schematically showing a configuration of an infrared temperature sensor and a periphery of the infrared temperature sensor in an occupant detection system according to a seventh embodiment.

In the state shown in FIG. 15, the infrared temperature sensor 120 is directed to the right. The range RG1 includes the reflection plate RF1, and the reflection plate RF2 is located outside the range RG1.

Figure 16:
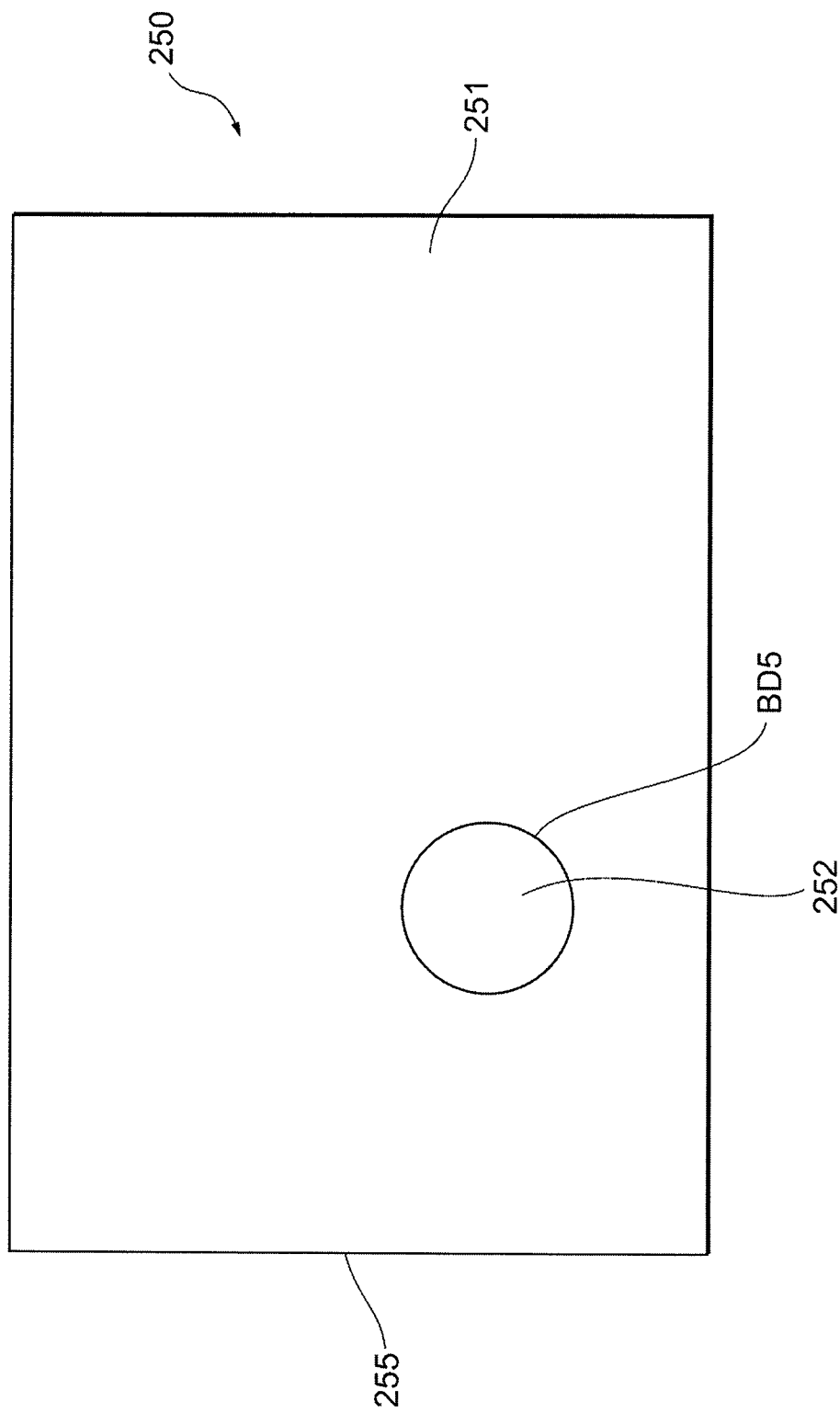
FIG. 16 is a diagram showing an example of a generated thermal image.

FIG. 16 shows an example of the thermal image 250 captured in the state of FIG. 15. A region 252 shown in FIG. 16 is a region drawn so that the temperature is different from the temperature of the other region 251 in the thermal image 250 due to the arrival of the infrared light reflected by the reflection plate RF1.

As a result, a temperature boundary BD5 having the same shape (in the embodiment, a circle) as the cross section of the infrared light emitted from the infrared light emitters LS10 is formed between the region 251 and the region 252 in the thermal image 250. The temperature boundary BD5 corresponds to the boundary between the portion of the reflection plate RF1 that reflects infrared light and the periphery thereof.

The correspondence relationship between the distance from the left end 255 of the thermal image 250 to the center of the temperature boundary BD5 (that is, the position of the temperature boundary BD5) and the direction of the infrared temperature sensor 120 at the time of capturing the image is uniquely determined according to the arrangement of the infrared temperature sensor 120, the reflection plate RF1, and the like. The storage 113 stores such a correspondence relationship in advance. In the present embodiment similar to the first embodiment, the controller 112 estimates the direction of the infrared temperature sensor 120 based on the correspondence relationship.

In the present embodiment, the temperature boundary BD5 in the thermal image 250 can be made clearer by, for example, increasing the intensity of the infrared light emitted from the infrared light emitter LS10, similarly to the sixth embodiment (FIG. 12). As a result, it is possible to estimate the direction of the infrared temperature sensor 120 based on the position of the temperature boundary BD5 more reliably and accurately.

In the present embodiment, the center position is used as the position of the temperature boundary BD5, but another position may be used as the position of the temperature boundary BD5. For example, the position of the left end of the temperature boundary BD5 in FIG. 16 may be used as the position of the temperature boundary BD5.

In the present embodiment, the similar control with reference to FIG. 14 is executed. As described above, when the controller 112 does not estimate the attitude of the infrared temperature sensor 120, the emission of the infrared light from the infrared light emitter LS10 is temporarily stopped.

The infrared light emitter LS10 may be arranged outside the case 150 as in this embodiment, but may be arranged inside the case 150.

An eighth embodiment will be described with reference to FIGS. 17 and 18. Hereinafter, only parts different from the first embodiment will be described, and description of parts common to the first embodiment will be omitted for explanation as appropriate.

The infrared temperature sensor 120 and the photographing position changer 130 according to the present embodiment are entirely housed inside a case 150, similarly to the fourth embodiment shown in FIG. 9. In the present embodiment, a plurality of infrared light emitters LS11 are arranged in the vehicle compartment RM. Each of the plurality of infrared light emitters LS11 is installed on a ceiling (not shown) in the upper side of the vehicle compartment, and is arranged to emit infrared light downward in the vertical direction. The plurality of infrared light emitters LS11 are arranged in a line along the left-right direction. Therefore, in FIG. 17, one of the plurality of the infrared light emitters LS11 disposed on the front side of the drawing is drawn. Each of the plurality of infrared light emitters LS11 corresponds to the "emitter" in the present embodiment. The controller 112 controls the start and stop of infrared emission in each of the plurality of infrared light emitters LS11.

Figure 17:
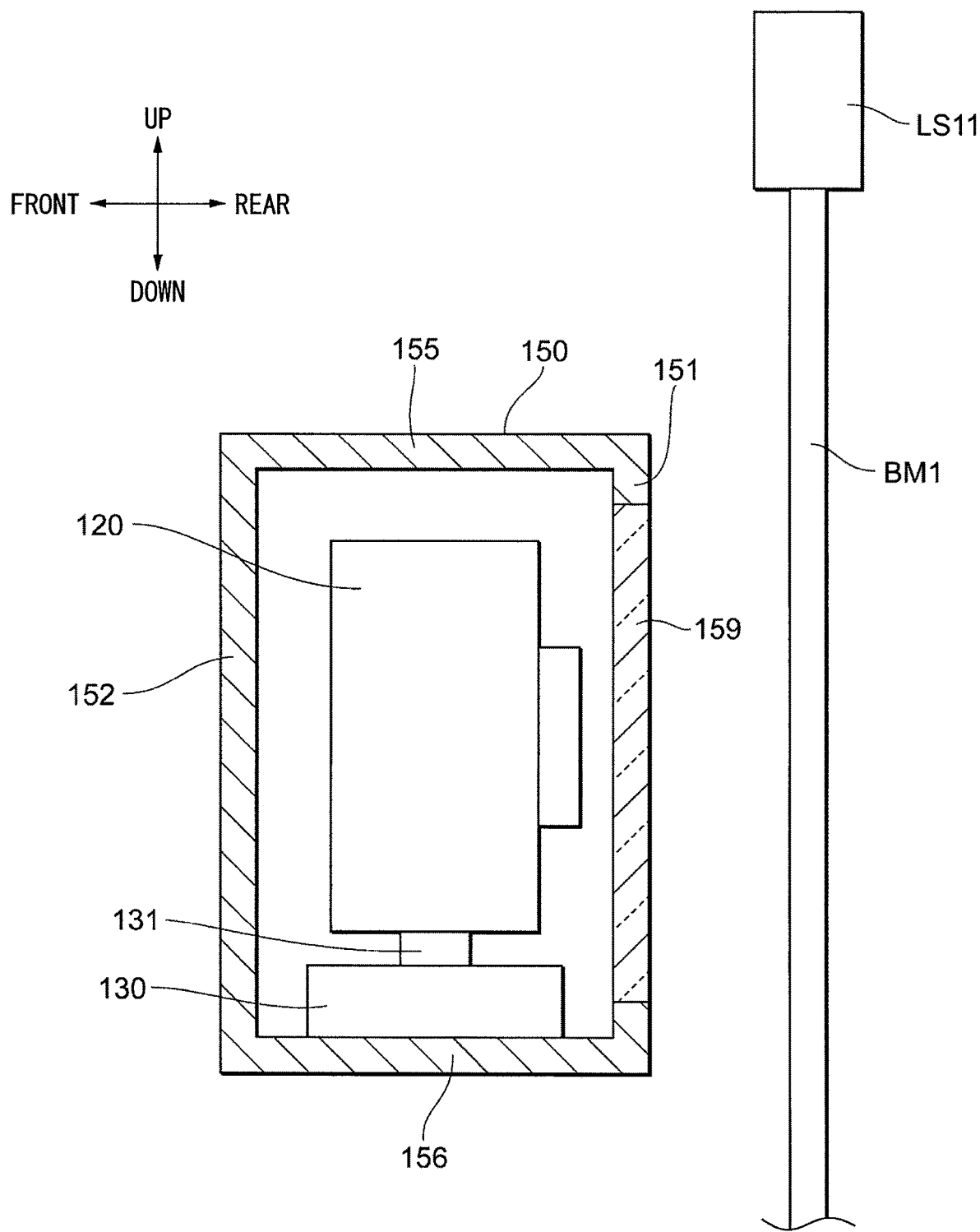
FIG. 17 is a diagram schematically showing a configuration of an infrared temperature sensor and a periphery of the infrared temperature sensor in an occupant detection system according to an eighth embodiment.

In FIG. 17 which is drawn as a side view, a drive shaft 131 of the photographing position changer 130 that is provided as a rotating electrical machine is shown. The drive shaft 131 is a cylindrical shaft whose rotation axis is disposed along the vertical direction, and extends upward from the photographing position changer 130. The infrared temperature sensor 120 is fixed to the upper end of the drive shaft 131.

As shown in FIG. 17, each of the plurality of infrared light emitters LS11 is arranged in the rear of the case 150 in the front-rear direction, and emits infrared light downward in the vertical direction. Therefore, the infrared light does not reach the case 150 and the infrared temperature sensor 120 directly. That is, each of the plurality of infrared light emitters LS11 emits infrared light from a specific position in the vehicle compartment RM in a direction different from (directly) the infrared temperature sensor 120.

Figure 18:
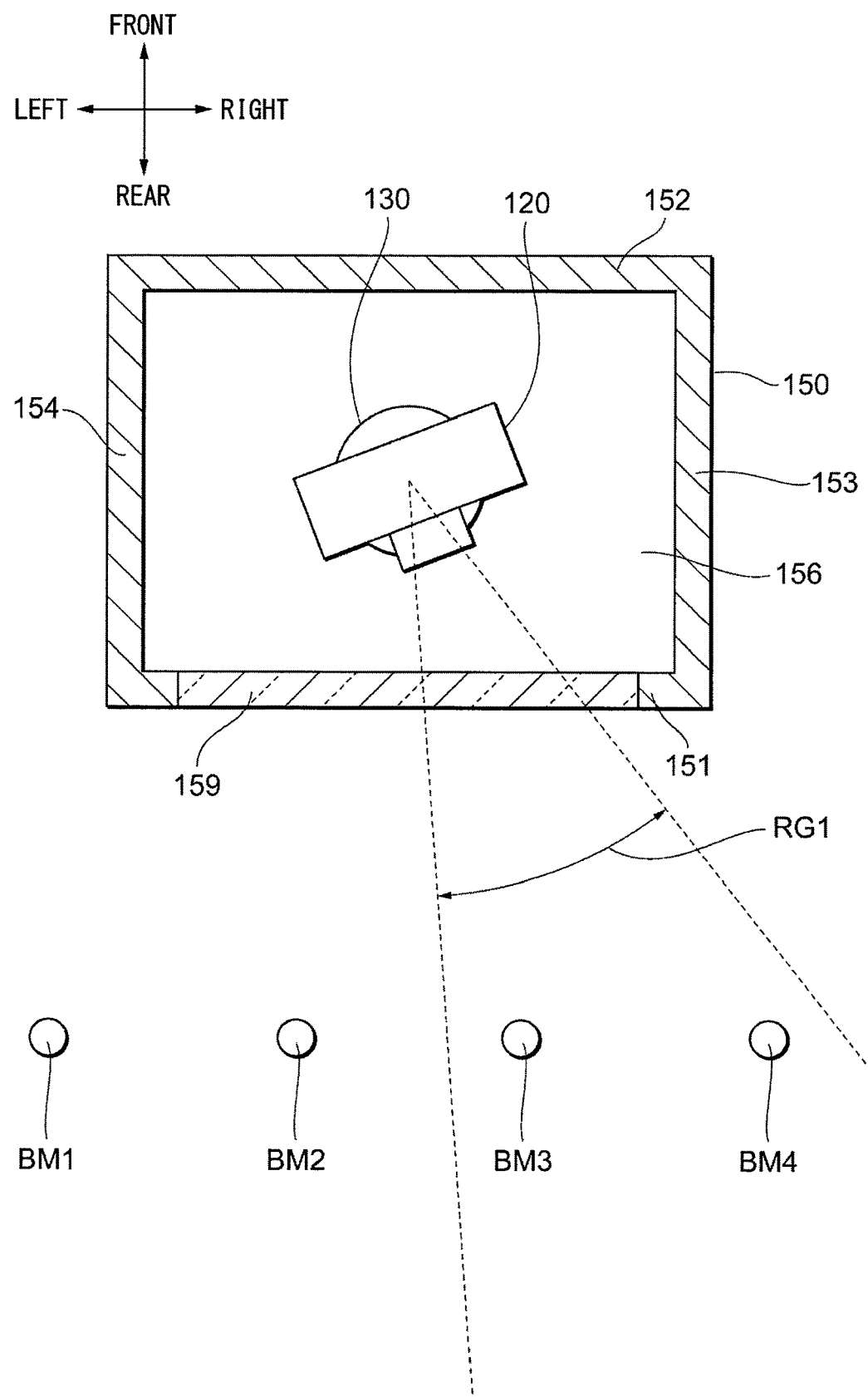
FIG. 18 is a top view diagram schematically showing the infrared temperature sensor and the like shown in FIG. 17.

In FIG. 17 and FIG. 18, linear space regions through which the infrared light emitted from the plurality of infrared light emitters LS11 pass are shown as regions BM1, BM2, BM3, BM4. Each of the regions BM1, BM2, BM3, BM4 corresponds to a "first space region" in the present embodiment. A space region around the regions BM1, BM2, BM3, BM4, that is, a space region through which the infrared light emitted from the infrared light emitter LS11 does not pass corresponds to a "second space region" in the present embodiment.

Figure 19:
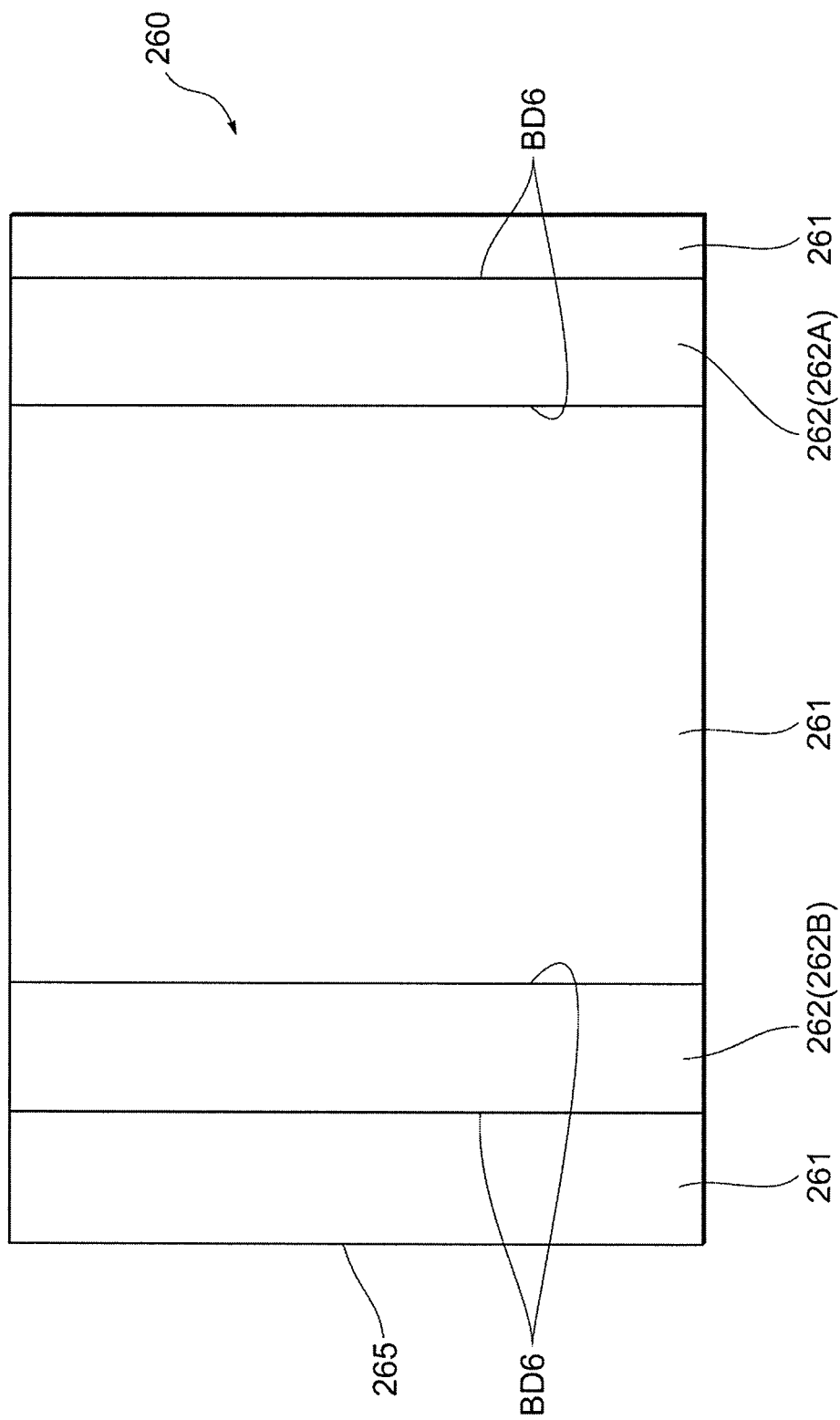
FIG. 19 is a diagram showing an example of a generated thermal image.

In the state shown in FIG. 18, the infrared temperature sensor 120 is directed to the right. The range RG1 includes the region BM3 and the region BM4 through which infrared light passes. FIG. 19 shows an example of the thermal image 260 captured in the state of FIG. 18.

The infrared light that passes through the region BM3 and the region BM4 does not directly reach the infrared temperature sensor 120 as described above. The partial infrared light reach the infrared temperature sensor 120 after being scattered by dust and dirt in the air. With this configuration, in the thermal image 260, two linear regions 262 are formed due to the influence of the infrared light reached from the region BM3 and the like. A region 262A of the regions 262 formed on the right in FIG. 19 is shown that the temperature is different from the temperature of the other region 261 in the thermal image 260 due to the arrival of the infrared light scattered from the area BM3. A region 262B of the regions 262 formed on the left in FIG. 19 is shown that the temperature is different from the temperature of the other region 261 in the thermal image 260 due to the arrival of the infrared light scattered from the area BM4.

As a result, the temperature boundary BD6, which has the same shape as the regions BM3, BM4, is formed between the region 261 and the regions 262 in the thermal image 260. The temperature boundary BD6 corresponds to a boundary between the region BM1 and the like through which the infrared light emitted from the plurality of the infrared light emitters LS11 pass (first space region) and the region through which infrared light does not pass (second space region).

The correspondence relationship between the distance from the left end 265 of the thermal image 260 to the center of the plurality of the regions 262 (that is, the positions of the temperature boundaries BD6) and the direction of the infrared temperature sensor 120 at the time of capturing the image is uniquely determined according to the arrangement of the infrared temperature sensor 120, the infrared light emitter LS11, and the like. The storage 113 stores such a correspondence relationship in advance. In the present embodiment similar to the first embodiment, the controller 112 estimates the direction of the infrared temperature sensor 120 based on the correspondence relationship.

In the present embodiment, the temperature boundary BD6 in the thermal image 260 can be made clearer by, for example, increasing the intensity of the infrared light emitted from the plurality of the infrared light emitters LS11, similarly to the sixth embodiment (FIG. 12). As a result, it is possible to estimate the direction of the infrared temperature sensor 120 based on the position of the temperature boundary BD6 more reliably and accurately.

In the present embodiment, the center position of each of the regions 262 is used as the position of the temperature boundary BD6, but another position may be used as the position of the temperature boundary BD6. For example, the position of the left end of the each of the regions 262 in FIG. 19 may be used as the position of the temperature boundary BD6.

The shapes of the regions BM1 and the like are preferably different from each other. With this configuration, the controller 112 can accurately identify the plurality of the infrared light emitters LS11 that correspond to the region 262A and the like based on the shape of the temperature boundary included in the thermal image. Thus, the controller 112 can more accurately estimate the direction of the infrared temperature sensor 120.

In the present embodiment, the similar control with reference to FIG. 14 is executed. As described above, when the controller 112 does not estimate the attitude of the infrared temperature sensor 120, the emission of the infrared light from the plurality of infrared light emitters LS11 is temporarily stopped.

The plurality of the infrared light emitters LS11 may be arranged outside the case 150 as in this embodiment, but may be arranged inside the case 150.

A ninth embodiment will be described with reference to FIG. 20. Hereinafter, only parts different from the first embodiment will be described, and description of parts common to the first embodiment will be omitted for explanation as appropriate.

The present embodiment is different from the first embodiment in the configuration of the photographing position changer 130 for changing the attitude (direction) of the infrared temperature sensor 120.

As shown in FIG. 20, the infrared temperature sensor 120 and the photographing position changer 130 according to the present embodiment are both housed inside a case 150. In FIG. 20, only a polymer fiber actuator 160 of photographing position changer 130 is shown, and other portions are not shown.

The polymer fiber actuator 160 is an actuator formed by twisting a fiber made of a polymer material such as polyamide in a helical shape so that its overall shape is roughly a rod shape (straight shape). The outer side of this fiber is coated with a metal. The polymer fiber actuator 160 operates according to externally supplied thermal energy. Specifically, when an electric current is applied to the coating by a heating device (not shown), the temperature of the polymer fiber actuator 160 rises due to Joule heating, and the fibers contract. As a result, a force is generated in the polymer fiber actuator 160 such that the tip portions of the polymer fiber actuator 160 rotate in the twisting direction. The supply of thermal energy to the polymer fiber actuator 160 by the heating device (that is, supply of current) is controlled by the controller 112.

The polymer fiber actuator 160 in the present embodiment includes a first drive portion 161 connecting the infrared temperature sensor 120 to the top plate 155, and a second drive portion 162 connecting the infrared temperature sensor 120 to the bottom plate 156. The first drive portion 161 and the second drive portion 162 are disposed in a state in which their central axes are aligned with each other. An upper end of the first drive portion 161 is fixed to the top plate 155 by a fixing member 163, and a lower end of the first drive portion 161 is fixed to the upper surface of the infrared temperature sensor 120. Further, the lower end of the second drive portion 162 is fixed to the bottom plate 156 by a fixing member 164, and an upper end of the second drive portion 162 is fixed to the lower surface of the infrared temperature sensor 120.

The orientation direction of the molecules in the first drive portion 161 (that is, the twist direction) is opposite to the orientation direction of the molecules in the second drive portion 162. Therefore, a direction (arrow AR11) in which a rotational force is applied from the first drive portion 161 to the infrared temperature sensor 120 when thermal energy is supplied to the first drive portion 161 is opposite to a direction (arrow AR12) in which a rotational force is applied from the second drive portion 162 to the infrared temperature sensor 120 when thermal energy is supplied to the second drive portion 162. The controller 112 controls the direction of the infrared temperature sensor 120 by adjusting the magnitude of thermal energy applied to each of the first drive portion 161 and the second drive portion 162.

As a thermal actuator that operates based on the heat energy supplied from the outside, for example, a shape memory alloy or the like can be employed other than the polymer fiber actuator of the present embodiment.

In a configuration in which the direction of the infrared temperature sensor 120 is changed using the thermal actuator, there is a possibility that the direction of the infrared temperature sensor 120 changes according to the air temperature in the vehicle compartment RM and the like. As a result, it is concerned that the actual direction of the infrared temperature sensor 120 may deviate from the direction of the infrared temperature sensor 120 recognized by the controller 112.

In the present embodiment, the controller 112 estimates the attitude (direction) of the infrared temperature sensor 120 based on the information included in the thermal image 210. With this configuration, it is possible to reliably prevent the direction of the infrared temperature sensor 120 from deviating as described above.

As described above, the example which estimates the direction of infrared temperature sensor 120 based on the information included in the thermal image captured by the infrared temperature sensor 120 was explained. The techniques as described above can be applied to various types of occupant detection systems.

Assume that the techniques may be applied to a system in which a CCD camera instead of the infrared temperature sensor 120 captures the vehicle compartment and the state of the occupant (for example, whether the occupant feels sleepy) is determined based on the obtained image. In this case, the direction of the CCD camera can be estimated based on a position of target having a particular shape.

The present embodiments have been described with reference to specific examples above. However, the present disclosure is not limited to these specific examples. Those skilled in the art appropriately modify design to these specific examples, which are also included in the scope of the present disclosure as long as they have the features of the present disclosure. The elements, the arrangement, the conditions, the shape, etc. of the specific examples described above are not limited to those examples and can be appropriately modified. The combinations of elements included in each of the above described specific examples can be appropriately modified as long as no technical inconsistency occurs.

The invention claimed is:

1. An occupant detection system configured to detect a state of an occupant in a vehicle compartment, the occupant detection system comprising:
   a sensor configured to photograph an inside of the vehicle compartment and generate an image;
   a photographing position changer configured to change an attitude of the sensor to change a position of an imaging region, which is a region photographed by the sensor, within the vehicle compartment;
   a controller configured to estimate the attitude of the sensor based on information included in the image and to control an operation of the photographing position changer based on the estimated attitude;
   a storage; and
   an emitter configured to emit infrared light toward the sensor from a specific position in the vehicle compartment, wherein:
   the sensor is provided by an infrared temperature sensor;
   the image is provided by a thermal image showing a temperature distribution of the vehicle compartment;
   the storage stores a correspondence relationship between a position of a boundary between a region in which the infrared light is emitted and a periphery of the region included in the thermal image and the attitude of the sensor;
   the controller estimates the attitude of the sensor based on the correspondence relationship; and
   the photographing position changer includes a thermal actuator that operates based on a heat energy supplied from an outside.

2. The occupant detection system according to claim 1, wherein
   the emitter temporarily stops emitting the infrared light when the controller does not estimate the attitude of the sensor.

3. The occupant detection system according to claim 1, wherein
   the thermal actuator is provided by a polymer fiber actuator.

4. An occupant detection system configured to detect a state of an occupant in a vehicle compartment, the occupant detection system comprising:
   a sensor configured to photograph an inside of the vehicle compartment and generate an image;
   a photographing position changer configured to change an attitude of the sensor to change a position of an imaging region, which is a region photographed by the sensor, within the vehicle compartment;
   a controller configured to estimate the attitude of the sensor based on information included in the image and to control an operation of the photographing position changer based on the estimated attitude;
   a storage;
   a reflection plate arranged at a specific position in the vehicle compartment; and
   an emitter configured to emit infrared light toward the reflection plate, wherein:
   the sensor is provided by an infrared temperature sensor;
   the image is provided by a thermal image showing a temperature distribution of the vehicle compartment;
   the reflection plate reflects the infrared light emitted from the emitter toward the sensor;
   a storage stores a correspondence relationship between a position of a boundary between a region in which the infrared light is reflected and a periphery of the region included in the thermal image and the attitude of the sensor;
   the controller estimates the attitude of the sensor based on the correspondence relationship; and
   the photographing position changer includes a thermal actuator that operates based on a heat energy supplied from an outside.

5. An occupant detection system configured to detect a state of an occupant in a vehicle compartment, the occupant detection system comprising:
   a sensor configured to photograph an inside of the vehicle compartment and generate an image;
   a photographing position changer configured to change an attitude of the sensor to change a position of an imaging region, which is a region photographed by the sensor, within the vehicle compartment;
   a controller configured to estimate the attitude of the sensor based on information included in the image and to control an operation of the photographing position changer based on the estimated attitude;
   a storage; and
   an emitter configured to emit infrared light in a direction different from a direction toward the sensor from a specific position in the vehicle compartment, wherein:
   the sensor is provided by an infrared temperature sensor;
   the image is provided by a thermal image showing a temperature distribution of the vehicle compartment;
   the storage stores a correspondence relationship between a position of a boundary between a first space region and a second space region included in the thermal image and the attitude of the sensor;
   the controller estimates the attitude of the sensor based on the correspondence relationship;
   the infrared light emitted from the emitter passes through the first space region;
   the infrared light emitted from the emitter does not pass through the second space region; and
   the photographing position changer includes a thermal actuator that operates based on a heat energy supplied from an outside.

6. An occupant detection system configured to detect a state of an occupant in a vehicle compartment, the occupant detection system comprising:
   a sensor configured to photograph an inside of the vehicle compartment and generate an image;
   a photographing position changer configured to change an attitude of the sensor to change a position of an imaging region, which is a region photographed by the sensor, within the vehicle compartment;
   a controller configured to estimate the attitude of the sensor based on information included in the image and to control an operation of the photographing position changer based on the estimated attitude;
   a storage; and
   a case configured to house the sensor, wherein:
   the sensor is provided by an infrared temperature sensor;

the image is provided by a thermal image showing a temperature distribution of the vehicle compartment;

the vehicle compartment has a first measurement region and a second measurement region;

an emissivity of the first measurement region is different from an emissivity of the second measurement region, and the first measurement region is adjacent to the second measurement region;

at least one of the first measurement region and the second measurement region corresponds to a part of the case;

the storage stores a correspondence relationship between a position of a boundary between the first measurement region and the second measurement region included in the thermal image and the attitude of the sensor;

the controller estimates the attitude of the sensor based on the correspondence relationship; and the photographing position changer includes a thermal actuator that operates based on a heat energy supplied from an outside.

7. The occupant detection system according to claim 1, wherein the sensor periodically changes the position of the imaging region to detect the position of the boundary between the region in which the infrared light is emitted and the periphery of the region for each part in the vehicle compartment.

8. The occupant detection system according to claim 1, wherein:

the emitter is provided by a plurality of emitters; and each arrangement pitch for two of the plurality of emitters adjacent to each other is non-uniform.

* * * * *